United States Patent
Abramov et al.

(10) Patent No.: US 12,489,315 B2
(45) Date of Patent: Dec. 2, 2025

(54) WIDE-RANGE POWER-REGULATION METHOD FOR WIRELESS POWER RECEIVING UNITS BY USING HYBRID MULTI-LEVEL TOPOLOGIES

(71) Applicant: CAPOW TECHNOLOGIES LTD, Beer Sheva (IL)

(72) Inventors: Eli Abramov, Beer-Sheva (IL); Alon Cervera, Netzer Sereni (IL)

(73) Assignee: CAPOW TECHNOLOGIES LTD, Beer Sheva (IL)

( * ) Notice: Subject to any disclaimer, the term of this patent is extended or adjusted under 35 U.S.C. 154(b) by 0 days.

(21) Appl. No.: 18/875,146

(22) PCT Filed: Jun. 14, 2023

(86) PCT No.: PCT/IL2023/050617
§ 371 (c)(1),
(2) Date: Dec. 15, 2024

(87) PCT Pub. No.: WO2023/242847
PCT Pub. Date: Dec. 21, 2023

(65) Prior Publication Data
US 2025/0167591 A1    May 22, 2025

(30) Foreign Application Priority Data

Jun. 15, 2022 (IL) .......................................... 293996

(51) Int. Cl.
*H02J 50/00* (2016.01)
*H02J 50/05* (2016.01)
(Continued)

(52) U.S. Cl.
CPC ........... *H02J 50/05* (2016.02); *H02M 1/0048* (2021.05); *H02M 1/007* (2021.05); *H02M 3/072* (2021.05); *H02M 3/08* (2013.01)

(58) Field of Classification Search
None
See application file for complete search history.

(56) References Cited

U.S. PATENT DOCUMENTS

| 12,047,077 B2 * | 7/2024 | Cervera .................... H03K 5/14 |
| 2017/0070096 A1 | 3/2017 | Madawala et al. |

OTHER PUBLICATIONS

Stoyka, K., et al., Development of a digitally controlled inductive power transfer system with post-regulation for variable load demand, Electronics. Dec. 25, 2021;11(1):58.

(Continued)

*Primary Examiner* — Jeffrey S Zweizig
(74) *Attorney, Agent, or Firm* — David B. Gornish; Eckert Seamans Cherin & Mellott LLC

(57) ABSTRACT

A power-regulated Power Receiving Unit (PRU) of an RWPT system, comprising an ML post-regulation stage via which a load is connected to the PRU; a controller circuit, being adapted to: determine target/predicted values for voltage and current of the a Power Transmit Unit (PTU) of the RWPT system; determine the wireless medium characteristics and resonant frequency of the RWPT system; generate an overall system model by using First Harmonic Approximation (FHA); determine a desired output power; calculate the voltage $V_{S1}$ of the first harmonic; use $V_{S1}$ to calculate the equivalent reflected impedance $Z_o$ of the load; and calculate the duty-cycle d using the predicted values of the efficiency n the conversion ratio M(D) and the calculated equivalent reflected impedance $Z_o$.

20 Claims, 33 Drawing Sheets

(51) Int. Cl.
*H02M 1/00* (2006.01)
*H02M 3/07* (2006.01)
*H02M 3/08* (2006.01)

(56) References Cited

OTHER PUBLICATIONS

Zhang, J., et al., Hybrid multilevel converters: Topologies, evolutions and verifications, Energies. Feb. 15, 2019;12 (4):615.
Vulfovich, A., et al., Modified first harmonic approximation-based modeling of SN-compensated inductive power transfer links operating at load-independent-voltage-output frequency, Simulation Modelling Practice and Theory. Sep. 1, 2021;111:102340.
Lin, BR, et al., Hybrid LLC converter with wide range of zero-voltage switching and wide input voltage operation, Applied Sciences. Nov. 20, 2020;10(22):8250.
Written Opinion of PCT/IL2023/050617, dated Sep. 7, 2023.
International Search Report of PCT/IL2023/050617, dated Sep. 7, 2023.

\* cited by examiner

WIDE-RANGE POWER-REGULATION METHOD FOR WIRELESS POWER RECEIVING UNITS BY USING HYBRID MULTI-LEVEL TOPOLOGIES

CROSS-REFERENCE TO RELATED APPLICATION

This application is a National Phase of PCT/IL2023/050617, filed on Jun. 14, 2023 which claims priority to and the benefit of Israel Application No. 293996, filed on Jun. 15, 2022, the disclosures of which are incorporated herein by reference in their entirety.

FIELD OF THE INVENTION

The present invention relates to the field of Wireless Power Transmission (WPT) systems. More particularly, the present invention relates to high-performance power-regulation and impedance matching method for power receiving units (PRUs), in wireless power transmission systems.

BACKGROUND OF THE INVENTION

Advanced wireless power technology applications (such as portable electronics, virtual and augmented reality, autonomous robots, drones etc. 0-0) require both extended power periods and spatial freedom. Although Wireless Power Transfer (WPT) technology enables to extend the power periods and reduce (or even eliminate) the use of bulky batteries, spatial freedom that allows 3-D movement is highly dependent on the coupling method and on the system's power-regulation capabilities 0-0.

In the context of dynamic WPT applications that consume low to high power (several watts up to kilo-watts), resonant-based WPT methods are preferable, since these methods enable better power transfer characteristics, such as spatial freedom, distance and power levels 0-0. However, resonant-based WPT is not sufficient, since for most applications, the output power (voltage, current or both) should be well regulated, regardless variations in the power transfer medium.

There are three types of state-of-the-art power-regulation methods for wireless Power Receiving Units (PRUs): passive regulation, active rectification and using a post-regulation stage 0.

Passive regulation (which is based on the resonant network configuration) is a straightforward approach, where constant voltage or current can be obtained at the output 0-0 by proper resonant network design. However, for industrial and commercial applications that require spatial freedom, this method is very limited, since in practice, wireless power transfer systems suffer from variations of the wireless medium, the electrical circuits and the resonators. In addition, passive power-regulation is not suitable for applications with load transitions, such as smart phones, laptops, tablets, etc.

Active rectification is based on controlling the conduction time of the power switches of an AC-DC rectifier. As a result, the amount of current delivered to the load is controlled, to obtain regulation at the output. Active rectification enables single stage regulation without compromising too much the overall efficiency 0-0. However, since resonant-based WPT systems typically operate at the multi-MHz range within the Industrial-Scientific-Medical (ISM) band (6.78 MHz, 13.56 MHZ, 27.12 MHz 0), the sensing circuitries and the controller can be quite complex and tedious. Moreover, this solution requires that the rectifier's power switches will be high-performance Wide Band-Gap (WBG) devices, such as silicon carbide (SiC) and gallium nitride (GaN). This results in higher costs and for some cases in labor intensive design efforts, particularly if the end-use application consumes medium to high power levels.

The third method for regulating power in wireless applications is using a post-regulation stage, in which, the rectifier stage is cascaded by a Low DropOut (LDO) regulator or a DC-DC converter 0, 0-0. An LDO regulator is an effective solution (regarding both cost and area) that can provide precise voltage regulation, while maintaining relatively small voltage ripple at the output. Another advantage of LDO approach is that it can be integrated with the PRU's controller into a single Power System-on-Chip (PSoC). However, for significant voltage (and power) levels, an LDO regulator is limited by its voltage-current ratings, power conversion efficiency, and overall dynamics. This limitation can be improved by using a DC-DC post-regulation stage (e.g. buck, boost, buck-boost). A post-regulator is the closest to Point-of-Load(POL), with significantly better dynamics than other methods. For battery-based and current-controlled commercial applications, DC-DC post-regulators are the only candidates that can satisfy the strict demands for precise load current regulation 0, 0. Aside from impedance matching for regulating the target power to the load, post-regulators can be also used for maximum efficiency tracking in the PRU 0, 0, where a specific equivalent impedance is required. Although DC-DC post-regulators allow improving the spatial freedom in WPT applications, at extreme misalignments and medium variations (coupling coefficient variations, in which a wider compensation range and higher conversion ratios are required, conventional post-regulators introduce significant losses, reducing the overall end-to-end efficiency of the WPT system.

Hybrid Multi-Level (HML) topologies provide large step-down/up conversion ratios, while maintaining higher efficiency and power density compared to conventional DC-DC converters 0-0. Even though this requires additional switches and passive components, in the context of very-high conversion ratios the overall volume is not compromised too much compared to conventional converters (assuming that the same operating conditions are employed).

Still, a framework for analysis and design of post-regulation stages has not been addressed in the context of wireless power systems.

It would be extremely beneficial if such design framework for WPT is utilized, since both the steady-state and the dynamic characteristics of the post-regulation stage are tightly coupled with the WPT stage.

It is therefore an object of the present invention to provide a wide-range power-regulation method for wireless PRUs with post-regulation stages and a wide impedance matching range.

It is another object of the present invention to provide a wide-range power-regulation method for wireless PRUs, with performance tradeoffs between conventional and HML regulators in resonant-based WPT system.

It is a further object of this invention to provide wide-range power-regulation method for wireless PRUs, while improving performance and characteristics of an HML post-regulator based WPT system, operating under various misalignments and variations.

Other objectives and advantages of the invention will become apparent as the description proceeds.

SUMMARY OF THE INVENTION

A power-regulation method for a power receiving unit (PRU) of an RWPT system, comprising:

a) connecting a load to the PRU via an ML post-regulation stage;
b) determining target/predicted values for voltage and current of the a Power Transmitting Unit (PTU) of said RWPT system;
c) determining the medium characteristics and resonant frequency of the RWPT system;
d) generating an overall system model by using First Harmonic Approximation (FHA);
e) determining a desired output power;
f) calculating the voltage $V_{S1}$ of the first harmonic;
g) using $V_{S1}$ to calculate the equivalent reflected impedance $Z_0$ of the load; and
h) calculating the duty-cycle d using the predicted values of the efficiency n the conversion ratio M(D) and the calculated $Z_0$.

The method may further comprise the step of examining the duty-cycle ranges and post-regulator performance for corner operating points of the RWPT system.

The ML post-regulation stage may be integrated into the PRU.

The ML post-regulation stage may be adapted to perform step-up, step-down conversion ratios, or both.

The ML post-regulation stage may be implemented in a Hybrid Multi-Level (HML) topology with high conversion ratio.

The method may further comprise the step of using HML post-regulation for performing wide impedance matching for the WPT system.

The HML post-regulator may be cascaded with an AC-DC rectifier stage.

The power transmitting unit (PTU) may be modeled as a current-controlled module.

The method may further comprise the step of working at optimal operating conditions.

The ML post-regulation stage may be designed according to specific target wireless operating conditions.

The PTU may comprise:
a) a DC-DC pre-regulation stage;
b) a DC-AC power inverter;
c) a transmitter resonator, resonating at the same frequency as the resonator of the PRU;
d) a power transmitting element; and
e) a controller for compensating misalignments between the PTU and the PRU.

The PRU may comprise:
a) a pick-up element;
b) a receiver resonator, resonating at the same frequency as the resonator of the PTU;
c) an AC-DC rectifier;
d) a DC-DC hybrid post-regulation stage; and
e) a controller for compensating misalignments between the PTU and the PRU.

The power regulation may be for several PRUs simultaneously, wherein each PRU comprises a corresponding HML post-regulator.

The PRU may comprise a high-conversion HML buck post-regulation stage.

The buck post-regulation stage may comprise:
a) four power switches;
b) a flying capacitor;
c) an output inductor;
d) an output capacitor;
e) a sensing circuitry for a controller.

A power-regulated Power Receiving Unit (PRU) of an RWPT system, comprising:

a) an ML post-regulation stage via which a load is connected to the PRU;
b) a controller circuit, being adapted to:
c) determine target/predicted values for voltage and current of the a Power Transmit Unit (PTU) of the RWPT system;
d) determine the wireless medium characteristics and resonant frequency of the RWPT system;
e) generate an overall system model by using First Harmonic Approximation (FHA);
f) determine a desired output power;
g) calculate the voltage $V_{S1}$ of the first harmonic;
h) use $V_{S1}$ to calculate the equivalent reflected impedance $Z_0$ of the load; and
i) calculate the duty-cycle d using the predicted values of the efficiency n the conversion ratio M(D) and the calculated equivalent reflected impedance $Z_0$.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

Figure 13A:
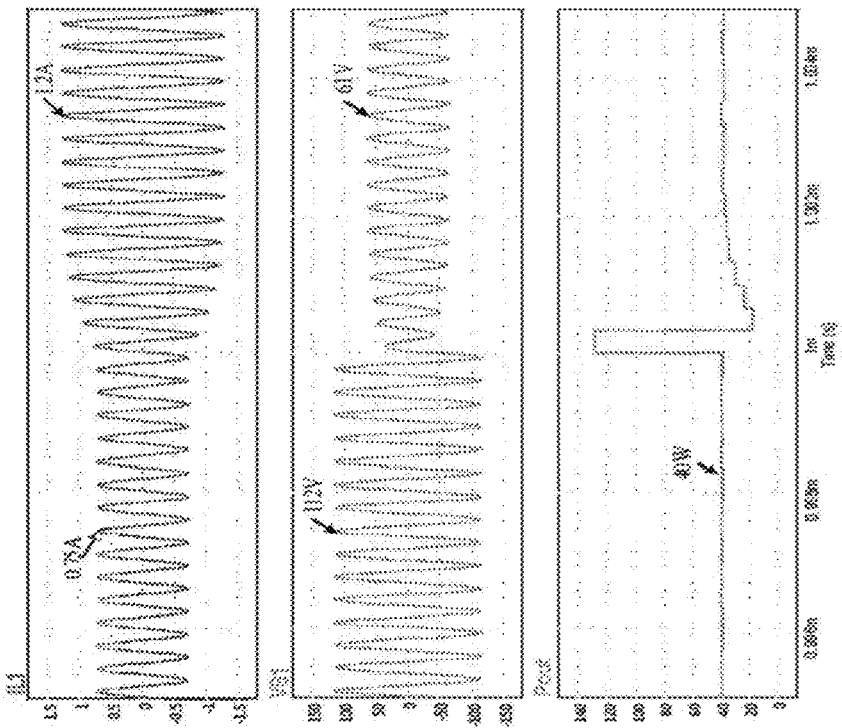
Figure 13B:
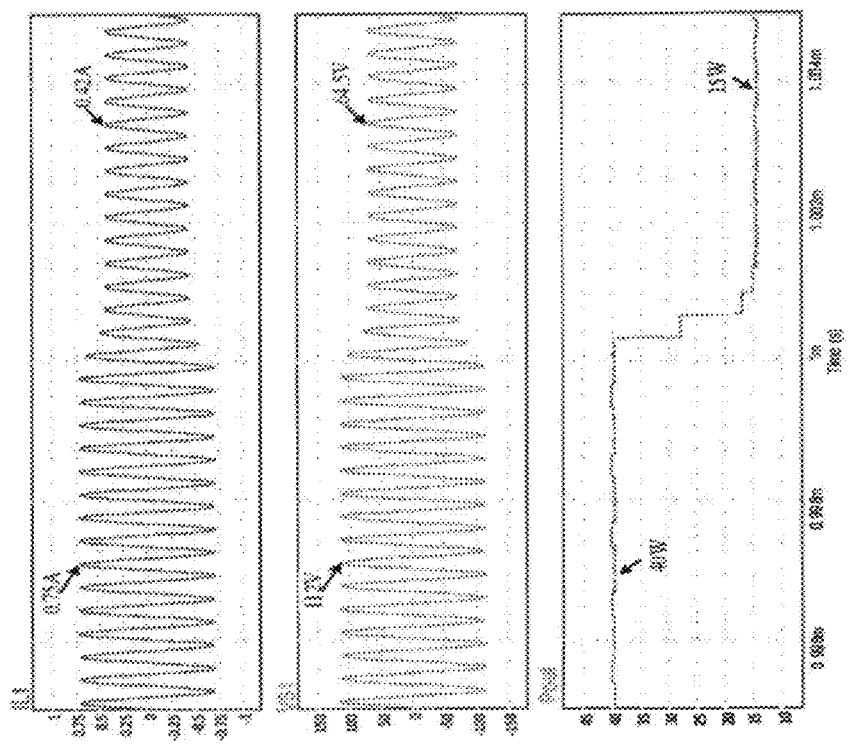
Figure 14:
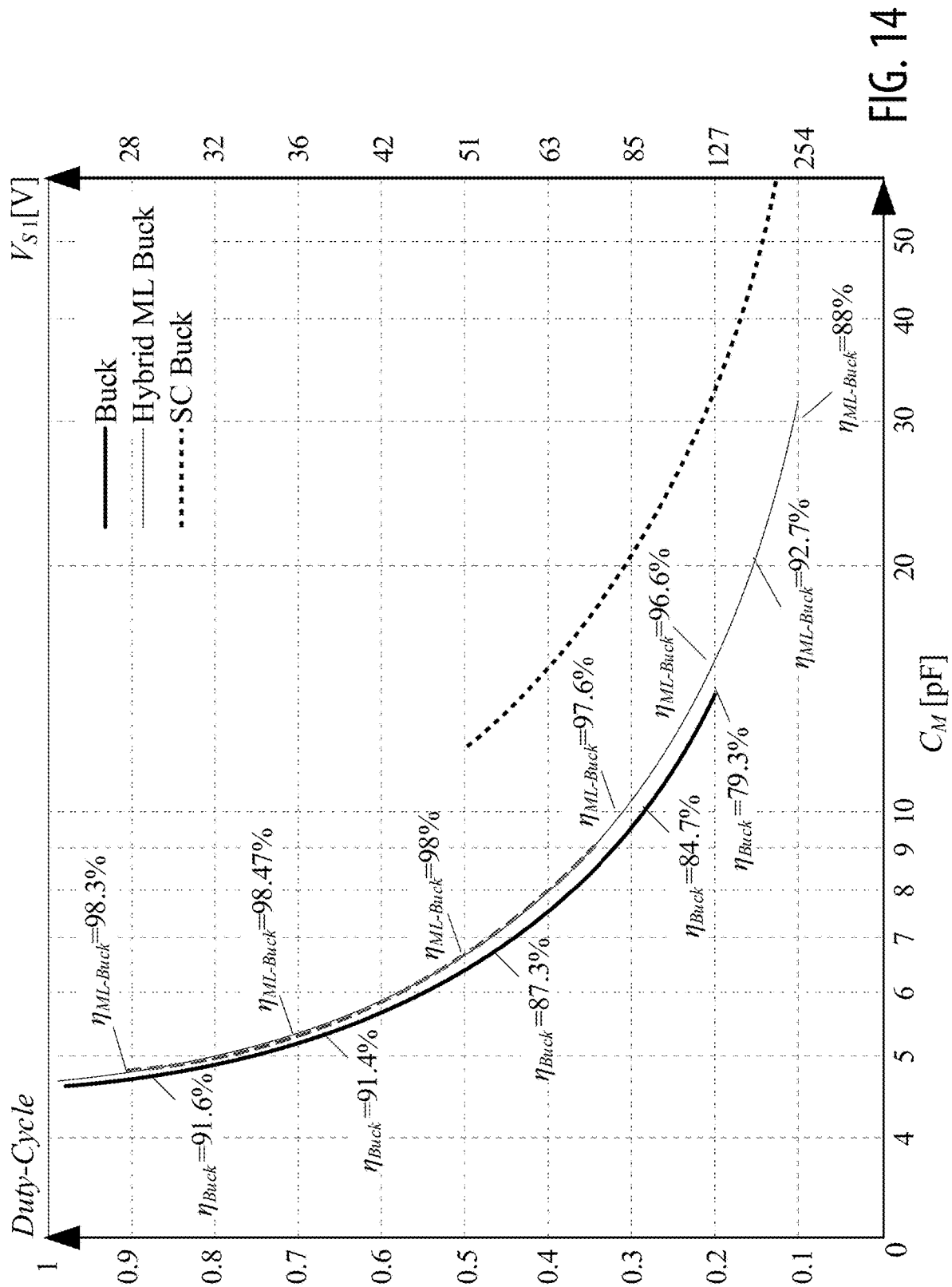
Figure 15A:
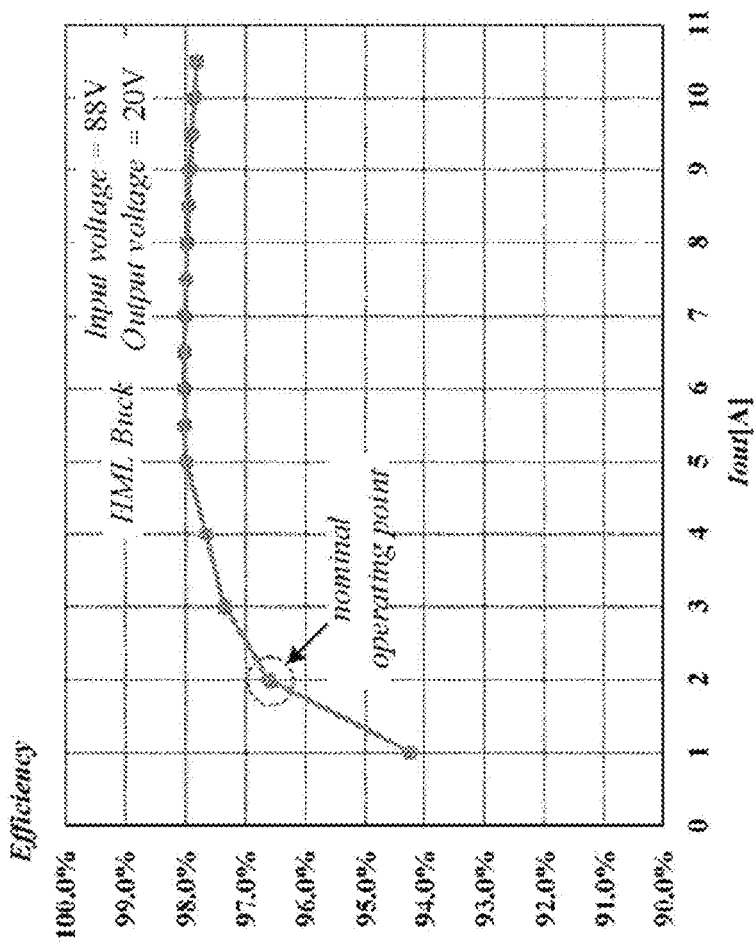
Figure 15B:
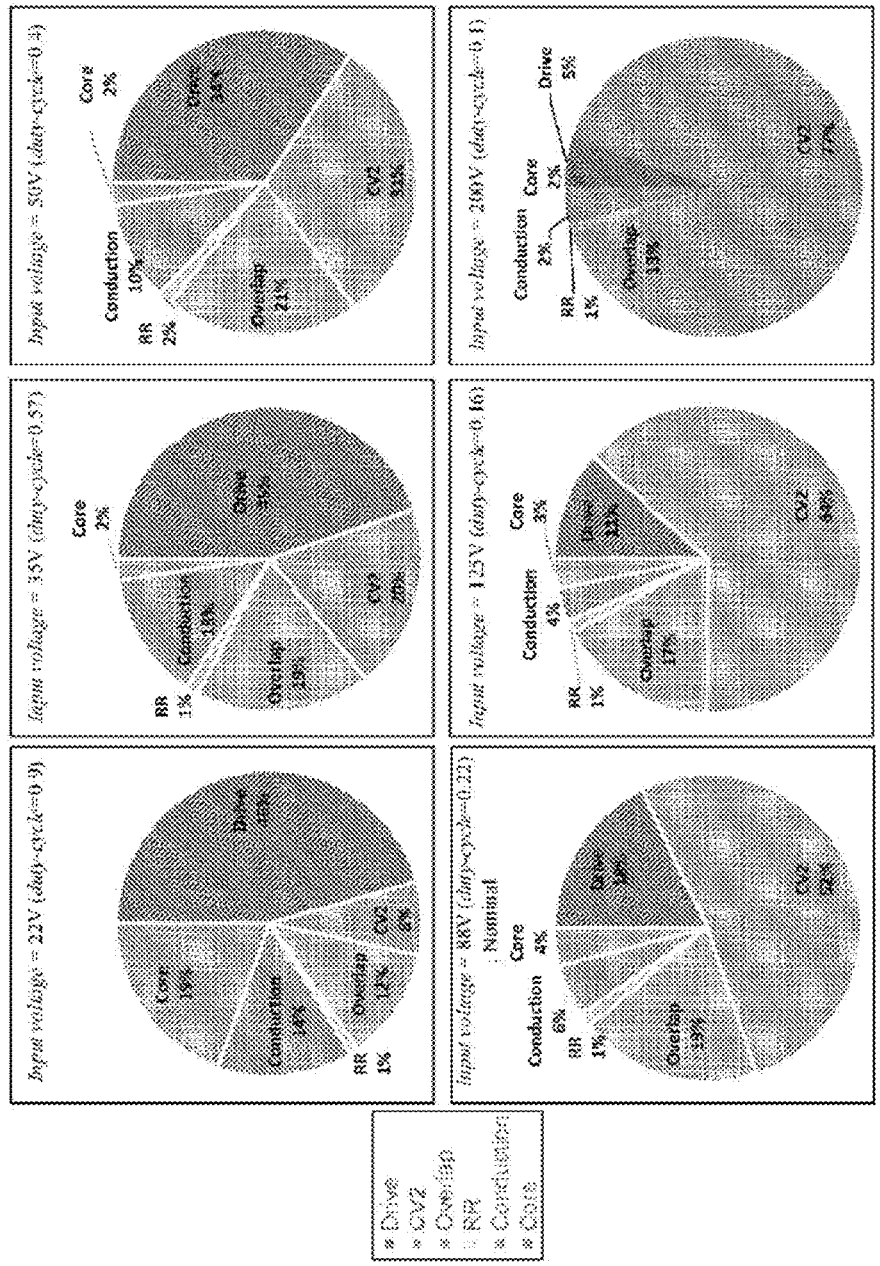
Figure 16A:
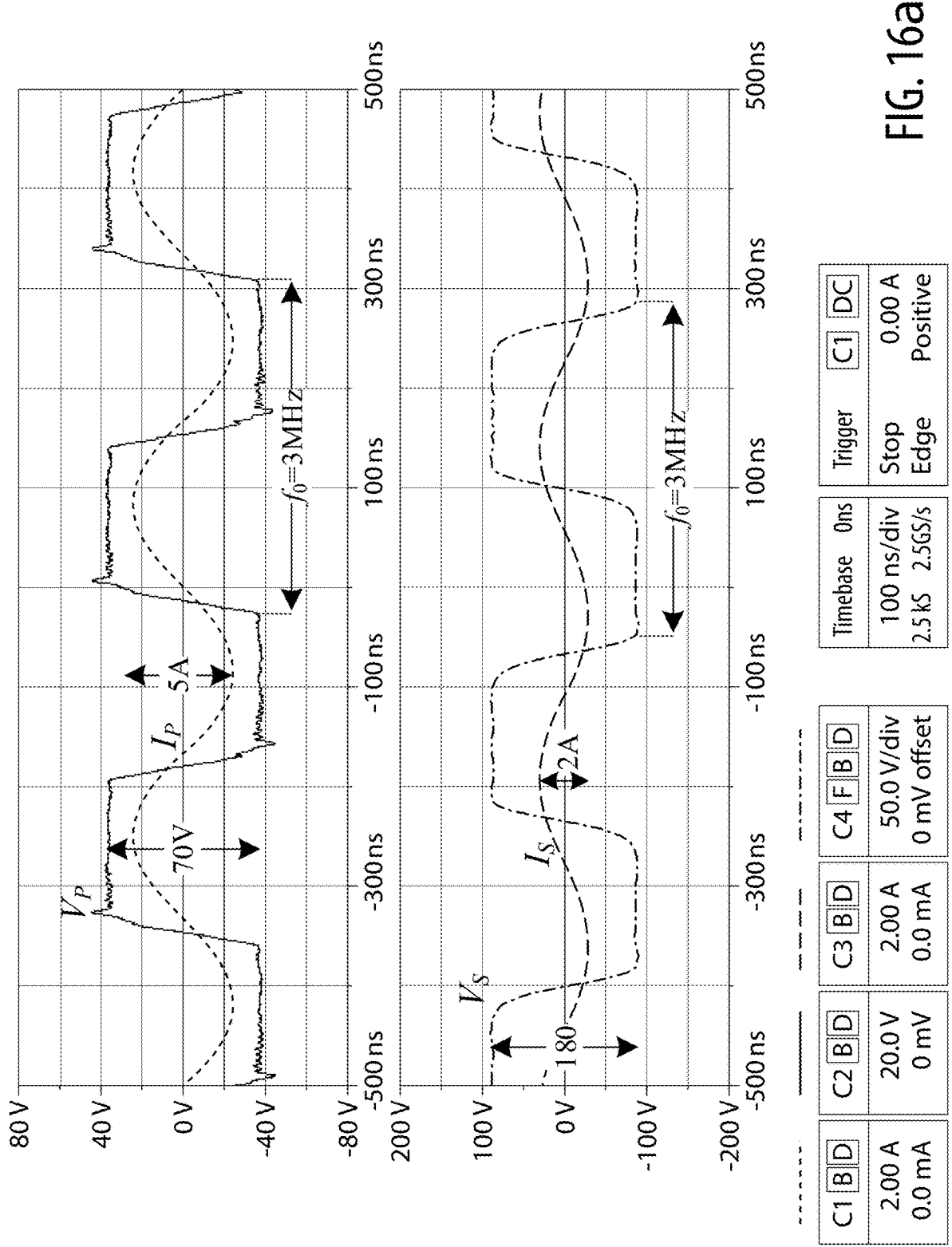
Figure 16B:
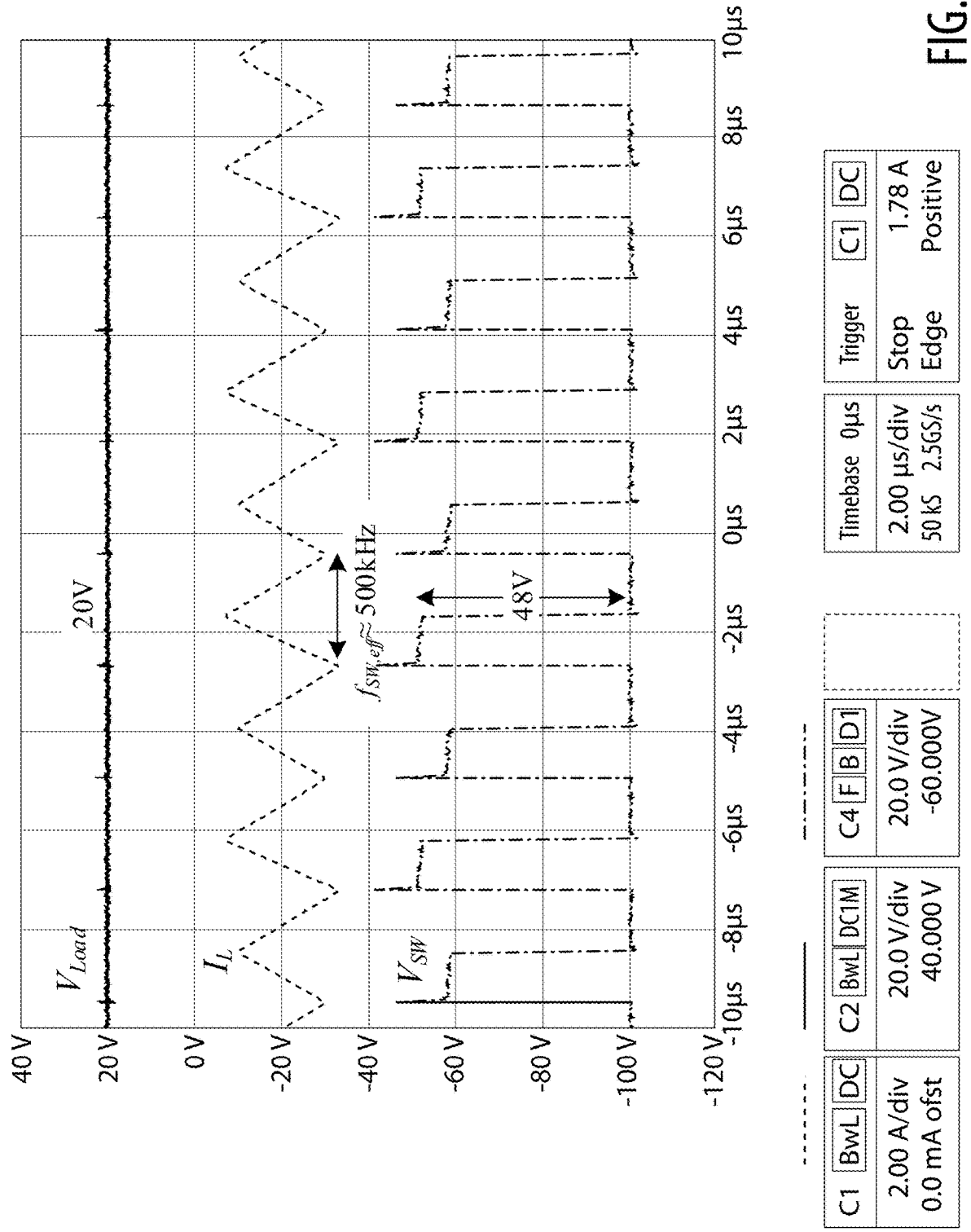

Waveforms of the PRU behavioral model for step-up medium variation: (a) with compensation, (b) without compensation;

FIG. 13a-13b show waveforms of the PRU behavioral model for step-up medium variation with and without compensation, respectively;

FIG. 14 shows conversion ratio ranges of different post-regulators for the RWPT system;

FIG. 15a shows efficiency measurements of the HML buck as a function of the load current at input voltage of 88 V;

FIG. 15b shows loss breakdown of the HML buck as a function of the input voltage;

FIGS. 16a-16b show experimental results of the system at 75 mm (CM≈14 pF) misalignment;

FIGS. 17a-17d show experimental measurements of the capacitive RWPT system for step-up medium variation, 14 pF to 20 pF; and FIGS. 18a-18d show Experimental measurements of the capacitive RWPT system for step-down medium variation, 14 pF to 8 pF.

DETAILED DESCRIPTION OF THE INVENTION

The present invention provides a power regulation method for Power Receiving Units (PRUs) in Resonant Wireless Power Transfer (RWPT) systems by using hybrid multi-level (HML) post-regulators. A behavioral model for the PRU including the additional regulation stage has been developed. By using HML stages for power-regulation, significant wider impedance matching range has been achieved, which results in better spatial freedom of wireless power systems. The method of the present invention also provides design tradeoffs between several post-regulators in terms of efficiency, coupling range and conversion range.

Figure 1:
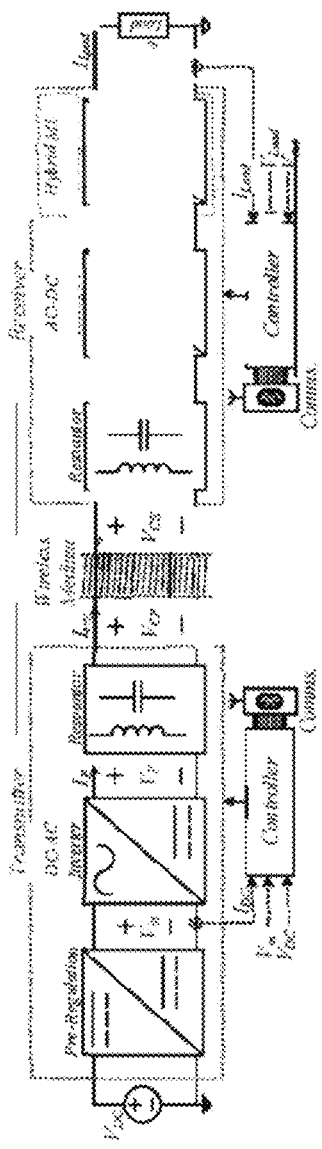
FIG. 1 shows a block diagram block diagram of a controlled RWPT system with a hybrid multi-level post-regulator at the PRU, according to an embodiment of the invention.

FIG. 1 shows a block diagram block diagram of a controlled RWPT system with a hybrid multi-level post-regulator at the PRU, according to an embodiment of the invention.

The basic topology is an RWPT system with double-sided LC resonant converter configuration 0, 0. The goal is to ensure that the voltage (Vload) across the load will remain constant even though the distance between the receiver and the transmitter varies due to movements of the user. An ML post-regulation stage or an HML post regulation module that consists of a multistage DC-DC converter is used to regulate the voltage Vload and to provide wide impedance matching capability, in order to maintain high efficiency and low losses for any desired power level, under all conditions. The ML post-regulation stage may be integrated into the PRU. The HML post-regulator may be cascaded with an AC-DC rectifier stage.

Figure 2A:
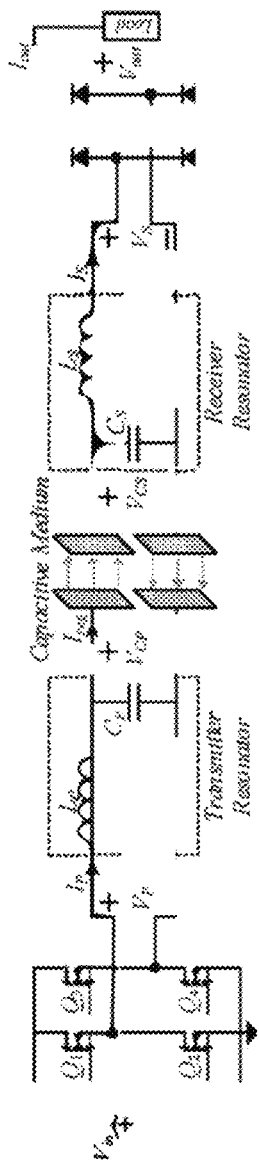
FIG. 2a (prior art) illustrates a typical capacitively-coupled RWPT system.

FIG. 2a (prior art) illustrates a typical capacitively-coupled RWPT system. The wireless medium consists of by two pairs of conductive coupling plates, such as copper foils or aluminum 0, 0, 0. The capacitive medium can be modeled as π-type network 0, 0 as shown FIG. 2b (prior art). Assuming loosely-coupled operation, i.e., the coupling capacitances $C_M$, $C_{M1}$, $C_{M2}$, are relatively low compared to $C_P$ and $C_S$ 0, 0, 0, the drive frequency, $f_{INV}$, is near the resonators natural frequency (i.e., $f_{INV} \approx f_0 = 1/(2\pi\sqrt{L_P C_P})$ $=1/(2\pi\sqrt{L_S C_S})$, then the currents as well as voltages of the passive components are virtually sinusoidal 0. This is since high-Q operation is naturally facilitated as the effective output impedance of the resonator in the transmitter is relatively high.

Figure 2B:
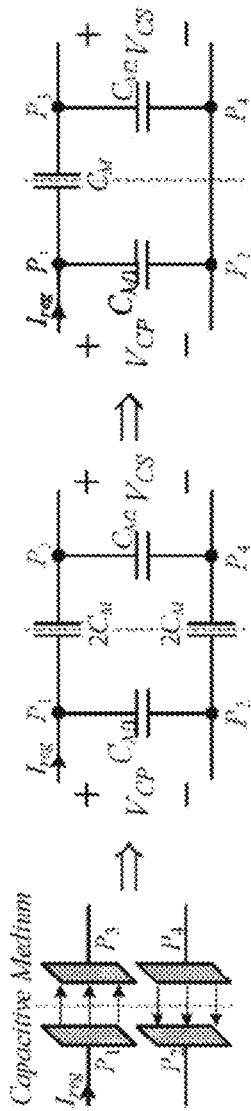
FIG. 2b illustrates a capacitive medium. modeled as a x-type network.
Figure 2C:
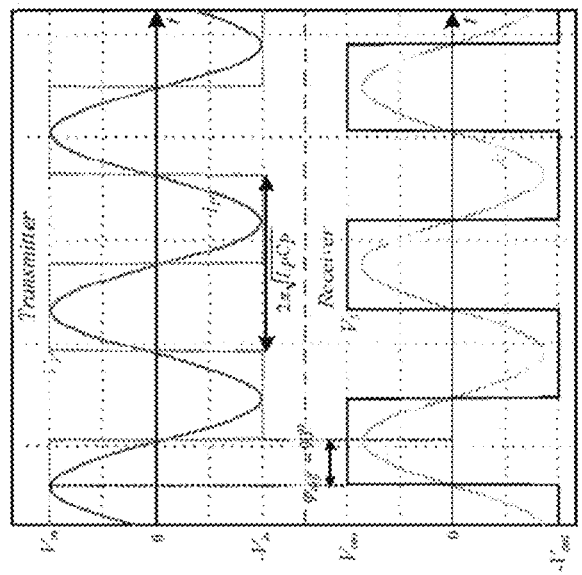
FIG. 2c shows typical waveforms of the system of the RWPT system.
Figure 2D:
FIG. 2d illustrates modelling the overall RWPT system.

FIG. 2c (prior art) shows typical waveforms of the system. While the transmitter and receiver voltages $V_P$ and $V_S$ are square waves, the currents are sinusoidal due to high-Q operation of the circuit. Since a full-bridge inverter is used at the front-end, the transmitter voltage $V_P$ toggles between $\pm V_{in}$, while the receiver voltage, $V_S$, toggles between $\pm V_{out}$. It can be also seen, that for both the transmitter and receiver sides the current is in phase with the voltage, whereas the receiver current $I_S$ lags the transmitter current $I_P$ by 90° (same applies for the voltages $V_S$ and $V_P$). By employing First Harmonic Approximation (FHA), and by utilizing the capacitive medium model (as shown in FIG. 2b), the overall system can be modeled, as shown in FIG. 2d (prior art). VP1 and VS1 represent the first harmonics of the square waves $V_P$ and $V_S$, where the magnitudes of the first harmonic are $4V_{in}/\pi$ and $4V_{out}/\pi$, respectively; $Z_0$ is the reflected impedance with respect to the load such that $Z_o=8/\pi^2 R_{Load}$. The above outcomes are obtained under the assumption that the transmitter and receiver are resonating at the same frequency.

Figure 3A:
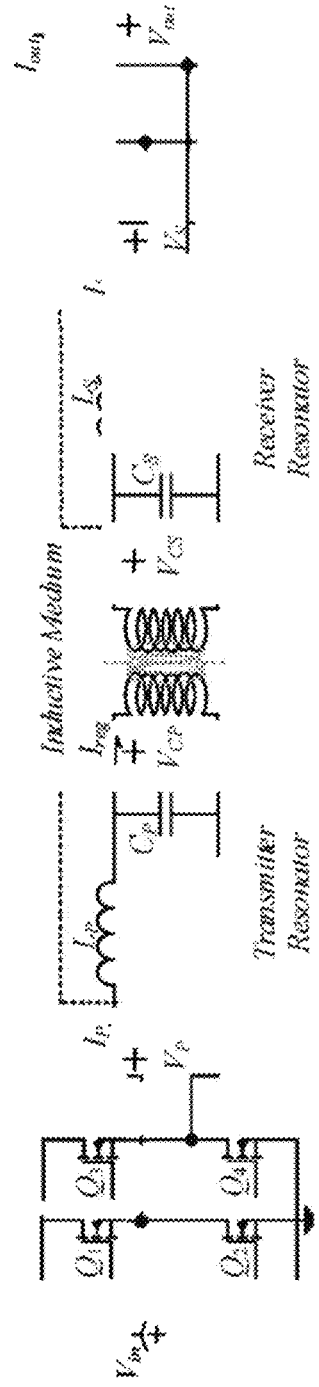
FIG. 3a (prior art) shows an inductive-based RWPT system with double-sided LC networks.
Figure 3B:
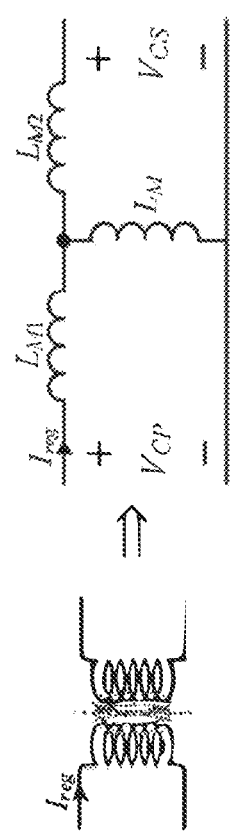
FIG. 3b (prior art) shows Inductive wireless medium model.

FIG. 3a (prior art) shows an inductive-based RWPT system with double-sided LC networks. The wireless inductive medium can be modeled as T-type network 0, as shown in FIG. 3b (prior art). Assuming that the inductive system is also loosely-coupled, and that both the transmitting and receiving sides are resonating at the same frequency, and by employing FHA on the inductive RWPT system, the behavior of the main currents and voltages of the inductive system can be extracted(in a similar manner to the capacitive-based system analysis).

Figure 3C:
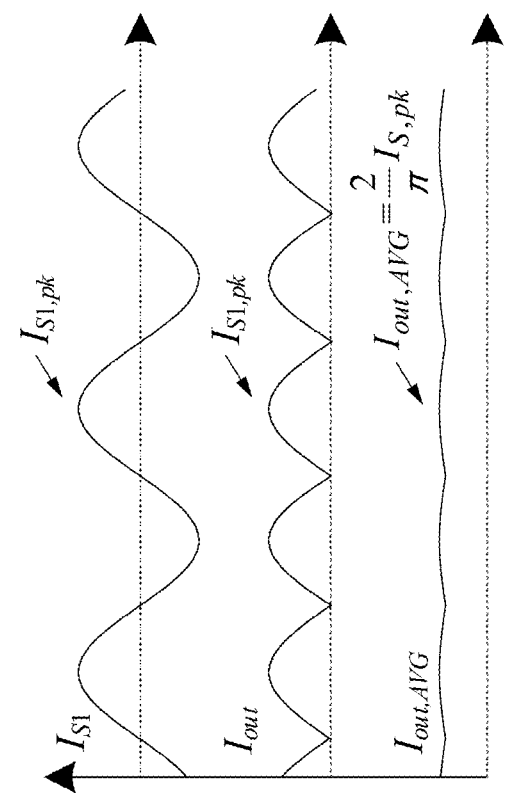
FIG. 3c (prior art) shows typical currents and voltages waveforms of the inductive RWPT system at the PRU.
Figure 3C:
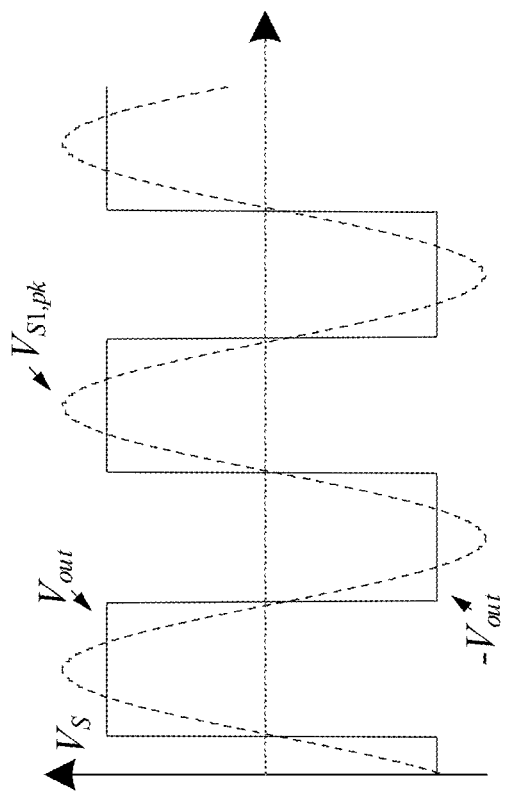

FIG. 3c (prior art) shows the currents and voltages of the receiver before and after the rectifier stage, $V_{S1}$ is the voltage of the first harmonic and where $I_{S1}$ is the current of the first harmonic. Assuming that $I_{out}$ is filtered by an output capacitor, the average output current and voltage are $$\begin{cases} I_{out,AVG} = \dfrac{2}{\pi} I_{S1,PK} \\ V_{out,AVG} = \dfrac{\pi}{4} V_{S1,PK} \end{cases} \quad (1)$$

Figure 3D:
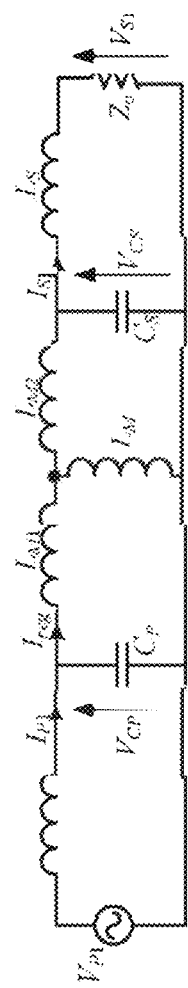
FIG. 3d (prior art) shows an overall system model by employing first harmonic approximation.

Similarly to the capacitive system, by employing FHA the overall inductive RWPT system can be modeled, as shown in FIG. 3d (prior art).

The above analytical relationships and waveforms behavior shown in FIG. 2c and FIG. 3c, are valid for both covered RWPT systems.

Equivalent Impedance Reflection

Figure 4:
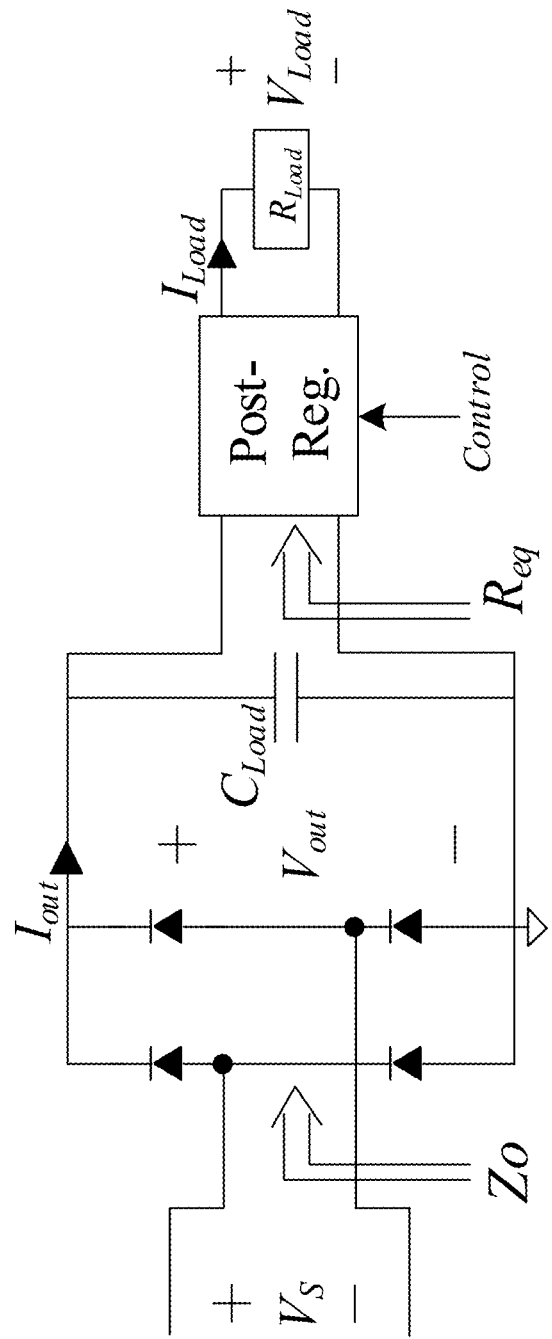
FIG. 4 shows a simplified schematic diagram of the PRU output stages, according to an embodiment of the invention.

FIG. 4 shows a simplified schematic diagram of the PRU output stages, according to an embodiment of the invention. Assuming steady-state conditions, the post-regulation can be considered as a three-port stage that comprises input power, output power and a control signal, such that the output voltage can be represented in a generic form as follows 0:

$$V_{Load} = M(D) \cdot V_{out}, \quad (2)$$

where $V_{out}$ is the voltage after the rectifier stage, and M(D) is the conversion ratio of the post-regulator at steady-state. M(D) is a function of the duty-cycle d(t). By taking into consideration the efficiency factor in such regulators, it can be assumed that the generic form of the output current is $$I_{Load} \frac{I_{out}}{M(D)} \eta \quad (3)$$

where $I_{out}$ is the current after the rectifier stage and $\eta$ is the efficiency of the regulator. By substituting (2) into (3), the equivalent input resistance of the post-regulator can be expressed as $$R_{eq} = \frac{V_{out}}{I_{out}} = \frac{V_{Load}}{I_{Load} M^2(D)} \eta = \frac{R_{Load}}{M^2(D)} \eta, \quad (4)$$

By using the FHA relationships discussed above, the reflected impendence seen from the input of the rectifier stage, $Z_o$, can be expressed with respect to the load ($R_{Load}$) and the conversion ratio M(D) as $$Z_O = \frac{8}{\pi^2} R_{eq} = \frac{8}{\pi^2} \frac{R_{Load}}{M^2(D)} \eta. \quad (5)$$

$Z_o$ can be also expressed in a straightforward manner as $$Z_O = \frac{V_{S1}^2}{2P_O} \Rightarrow V_{S1}^2 = 2Z_O P_O \quad (6)$$

where $P_o = P_{Load}/\eta$ is the equivalent power of $Z_o$.

From (5) and (6) it can be seen that for given target output power and finite efficiency of the post-regulation, a wider range of M(d) enables a wider range of $Z_o$. A wider range of $Z_o$ entails better compensation for $V_S$ variations, which are primarily due to medium variations and the cross-coupling relationships between the transmitter and receiver, as will be discussed later on.

Example: Capacitive RWPT with Hybrid Multi-Level Buck Post-Regulator

Figure 5:
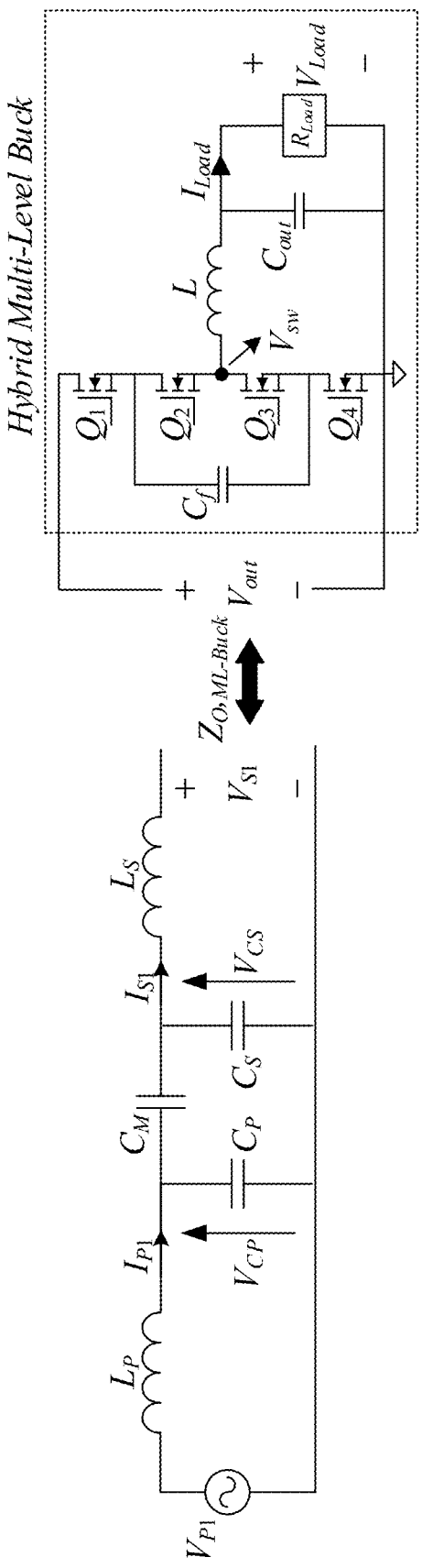
FIG. 5 illustrates a capacitively-coupled double-sided LC RWPT system with a wide-input step-down HML buck post-regulation stage.

FIG. 5 illustrates a capacitively-coupled double-sided LC RWPT system with a wide-input step-down HML buck post-regulation stage (a step-down converter is a DC-to-DC power converter which steps down voltage from its input to its output). The HML buck converter has several distinguishing advantages over the conventional buck converter 0. First, assuming that the charge balance across the flying capacitor, $C_f$ is maintained, the voltage swing at the switching node is half of the input voltage, which in the context of the WTP system, is half of the rectified voltage of $V_S$. The effective switching frequency ($1/T_{SW,eff}$) at the switching node, $V_{SW}$ is twice the switching frequency $f_{SW}=1/T_{SW}$. These features entail better power density and less efforts on the overall heat dissipation of the converter. In addition, in a conventional buck converter, due to the blocking voltage Vas, requirement of the switches 0, 0, both of the switches need to be rated for maximum input voltage of $V_S$. In the multi-level buck converter there are four switches which can be rated for $V_S/2$. Since silicon area for switch realization is approximately proportional to $V_{ds}^2$, the overall semiconductor areas of multi-level and conventional buck converters can be equivalent 0, 0. Typically, the volume of the output filter is significantly larger than that of the semiconductor components. In the case of the HML buck converter, due to the combined reduction of the voltage swing at the switching node, and two times higher effective switching frequency, the output filter is further reduced. Thus, the additional switches virtually do not introduce volumetric penalty 0. The multi-level buck converter does not require any additional peripherals, and the core control is the same as for the conventional buck converter, with potentially improved dynamics.

Figure 6:
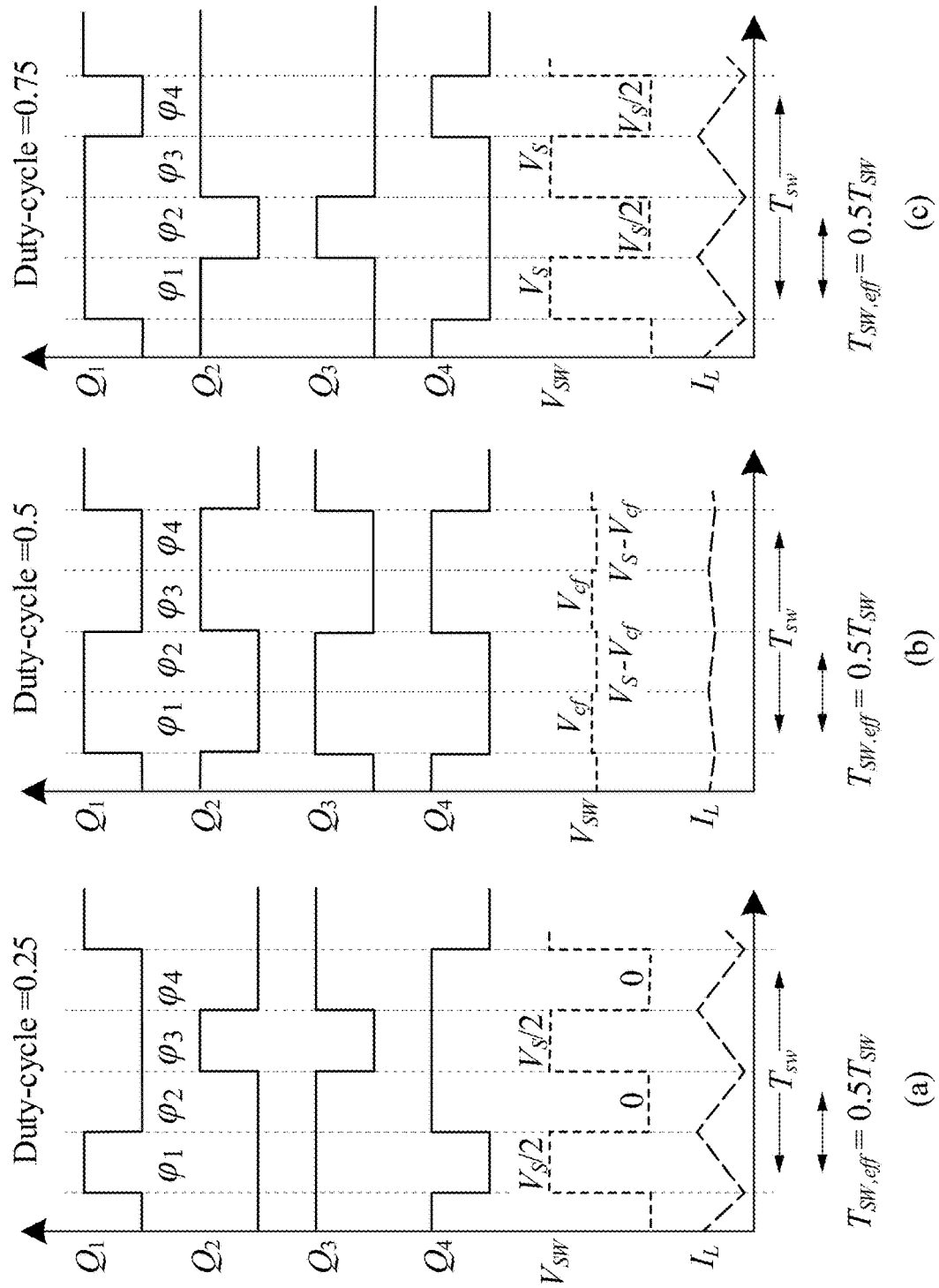
FIG. 6a-6c illustrate typical waveforms of the multi-level buck converter at steady-state.

FIGS. 6a-6c illustrate typical waveforms of the multi-level buck converter at steady-state. The operation of the buck converter is divided into four switching phases, in which, $Q_1$ and $Q_4$ are complementary, $Q_2$ and $Q_3$ are also complementary, and $Q_2$ is delayed from $Q_1$ in $T_{SW}/2$. It can be seen that for a case that $V_{Load}<V_S/2$ (FIG. 6a), the switching node toggles between 0 to $V_S/2$; for $V_{Load}=V_S/2$ (FIG. 6b), and neglecting the flying capacitor charge balance mismatches, the switching node is virtually constant and equals to $V_S/2=V_{Load}$, and the inductor current is also virtually constant $I_L=I_{Load}$; for $V_S/2<V_{Load}<V_S$ FIG. 6c) the switching node toggles between $V_S/2$ to $V_S$. It can be observed that for the entire operation region, the maximum voltage drop over the inductor (and the switches) is $V_S/2$.

The conversion ratio function M(D) of the HML buck converter is identical to the conventional buck converter and is equals to d(t). Thus, by using (5), the equivalent reflected impendence of the multi-level buck, $Z_{O,ML-Buck}$, is $$Z_{O,ML-Buck} = \frac{8}{\pi^2} \frac{R_{Load}}{d^2} \eta. \quad (7)$$

From (7), the duty ratio d can be calculated as $$d = \sqrt{\frac{8}{\pi^2} \frac{R_{Load}}{Z_{O,ML-Buck}} \eta}. \quad (8)$$

Figure 7:
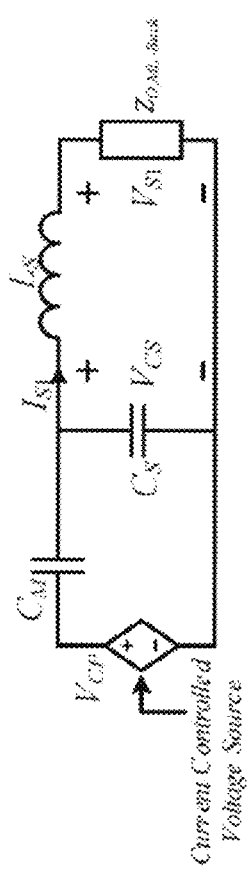
FIG. 7 illustrates a Behavioral model of the PRU while the transmitter is current-controlled.

One of the methods to control transmitters in RWPT systems, and in particular in multi-receiver RWPT systems, is by constant current regulation 0, 0, 0. By employing such a control approach on the analyzed capacitive system, the voltage $V_{CP}$ can be treated as constant. Therefore, the circuit in FIG. 5 can be simplified to the circuit shown in FIG. 7. By applying Kirchhoff's voltage law on the circuit of FIG. 7, the voltage $V_{CS}$ can be expressed as $$V_{CS} = V_{CP} \frac{Z_S}{Z_S + Z_{CM}} \quad (9)$$

$$\begin{cases} Z_S = Z_{CS} \| (Z_{LS} + Z_{O,ML-Buck}) \\ Z_{CM} = 1/j\omega C_M \end{cases}.$$

The voltage $V_{S1}$ can be expressed as $$V_{S1} = V_{CS} \frac{Z_{O,ML-Buck}}{Z_{O,ML-Buck} + j\omega L_S}. \quad (10)$$

By substituting (9) into (10), and rearranging the expression, $V_{S1}$ is expressed as $$V_{S1} = V_{CP} = \frac{Z_{O,ML-Buck}}{Z_{O,ML-Buck} + j\omega L_S + \frac{1 - \omega^2 L_S C_S + j\omega C_S Z_{O,ML-Buck}}{j\omega C_M}}, \quad (11)$$

and if operation in resonance is assumed, $V_{S1}$ can be simplified to $$V_{S1} = V_{CP} \frac{Z_{O,ML-Buck}}{Z_{O,ML-Buck}(1 + C_S/C_M) + j\omega L_S}. \quad (12)$$

By substituting the expression in (6) into (12), and after some manipulations, $V_{S1}$ can be further expressed as $$V_{S1} = \frac{\frac{V_{CP}C_M}{C_M + C_S} + \sqrt{\left(\frac{V_{CP}C_M}{C_M + C_S}\right)^2 - j4\omega L_S}}{2}. \quad (13)$$

RWPT systems operate in the MHz range. Therefore, the resonators' typical capacitance values are in the range of hundreds of pF, the inductances are tens to hundreds μH, and the mutual coupling capacitance, $C_M$, is in the order of a few pF. As a result, the expression in (13) can be simplified to generic expressions as follows $$\frac{V_{CP}C_M}{C_M + C_S} \gg 4\omega L_S \Rightarrow V_{S1} = \frac{V_{CP}C_M}{C_M + C_S}. \quad (14)$$

Having the relationships given in (6), (8) and (14), the duty ratio can be calculated for any operating point as a function of the operating conditions of the transmitter, medium variations (translates to changes in $C_M$), and the PRU resonator. The system may be adapted to work at optimal operating conditions, at which maximum efficiency is obtained.

Using the above analysis, generalized design guidelines to examine and design an end-to-end RWPT system with post-regulation stage is performed as follows: Given target/predicted values for the power transmitting unit (PTU), which may be modeled as a current-controlled module.
1) transmitter's voltages and currents, the wireless medium characteristics medium characteristics, resonators values and resonant frequency.
2) Assume operation in resonance and extract the overall system model by employing FHA.
3) Given the target output power, substitute (6) into (12), and calculate $V_{S1}$.
4) Use $V_{S1}$ to calculate $Z_o$ from (6).
5) Given nominal operating point, based on the chosen post-regulator, insert the predicted efficiency η, M(d), and $Z_o$ to (5), and calculate the duty-cycle d.
6) Examine the duty-cycle ranges and post-regulator performance for corner operating points of the RWPT system (which determine the desired voltage-current points at which the RWPT system should operate).

In one embodiment, the PTU comprises a DC-DC pre-regulation stage, a DC-AC power inverter, a transmitter resonator for resonating at the same frequency as the resonator of the PRU a power transmitting element and a controller for compensating misalignments between said PTU and the PRU.

In one embodiment, the PRU comprises a pick-up element; a receiver resonator, resonating at the same frequency as the resonator of the PTU; an AC-DC rectifier; a DC-DC hybrid post-regulation stage; and a controller for compensating misalignments between said PTU and the PRU.

In one embodiment, the power regulation is made for several PRUs simultaneously, wherein each PRU comprises a corresponding HML post-regulator.

The PRU comprises a high-conversion HML buck post-regulation stage.

In one embodiment, the buck post-regulation stage comprises four power switches; a flying capacitor; an output inductor; an output capacitor; a sensing circuitry for a controller.

Figure 8:
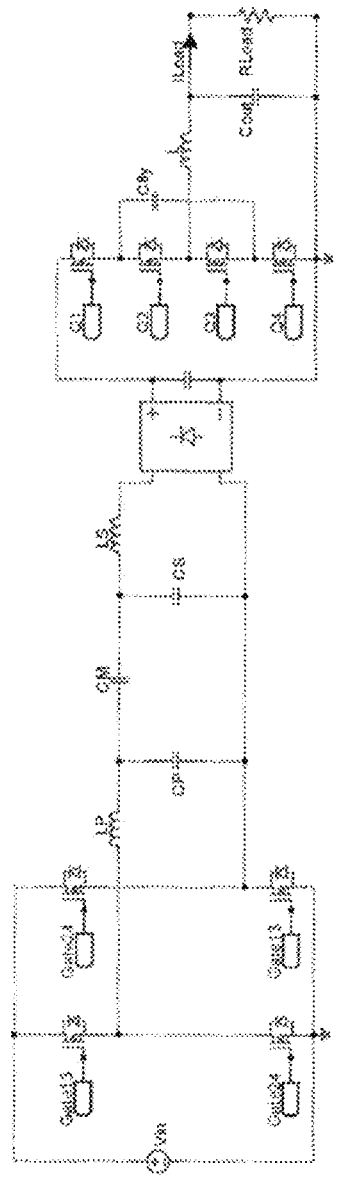
FIG. 8 illustrates a simulation test-bench for the analyzed capacitive RWPT system of the present invention, which has been constructed in PSIM platform.

FIG. 8 illustrates a simulation test-bench for the analyzed capacitive RWPT system of the present invention, which has been constructed in PSIM platform (of PowerSim, Inc.— PSIM is an electronic circuit simulation software package, designed specifically for use in power electronics and motor drive simulations). The input voltage was 25 V, the medium mutual capacitance $C_M$=14 pF, at resonant frequency $f0$=3 MHz. The resonators for the transmitter and receiver have been chosen to be $L_P$=20.8 μH, $C_P$=120 pF and $L_S$=21.65 μH, $C_S$=130 pF. The output stage comprises load resistance $R_{Load}$=10Ω, output capacitor $C_{Load}$=90 μF, output inductor L=10 μH, and flying capacitor, $C_{fly}$=10 μF. The switching frequency of the post-regulator, $f_{SW}$, was 250 kHz, and the target output power was 40 W, with a constant load voltage $V_{Load}$=20 V. The overall parameters and values of the test-bench are summarized in Table I.

TABLE I

SIMULATION TEST-BENCH VALUES AND PARAMETERS AT NOMINAL OPERATION

| Parameter | Value/Type |
| --- | --- |
| Input voltage $V_{in}$ | 25 V |
| Transmitter resonator | 20.8 μH, 120 pF |
| Receiver resonator | 21.6 μH, 130 pF |
| Resonant frequency $f_0$ | 3 MHz |
| Coupling capacitance $C_M$ | 14 pF |
| Load resistance $R_{Load}$ | 10 Ω |
| Output capacitor $C_{Load}$ | 90 μF |
| Output inductor L | 10 μH |
| Flying capacitor $C_{fly}$ | 10 μF |
| Post-regulator switching frequency $f_{SW}$ | 250 kHz (500 kHz effective) |
| Load voltage $V_{Load}$ | 20 V |
| Load power $P_{Load}$ | 40 W |

Figure 9A:
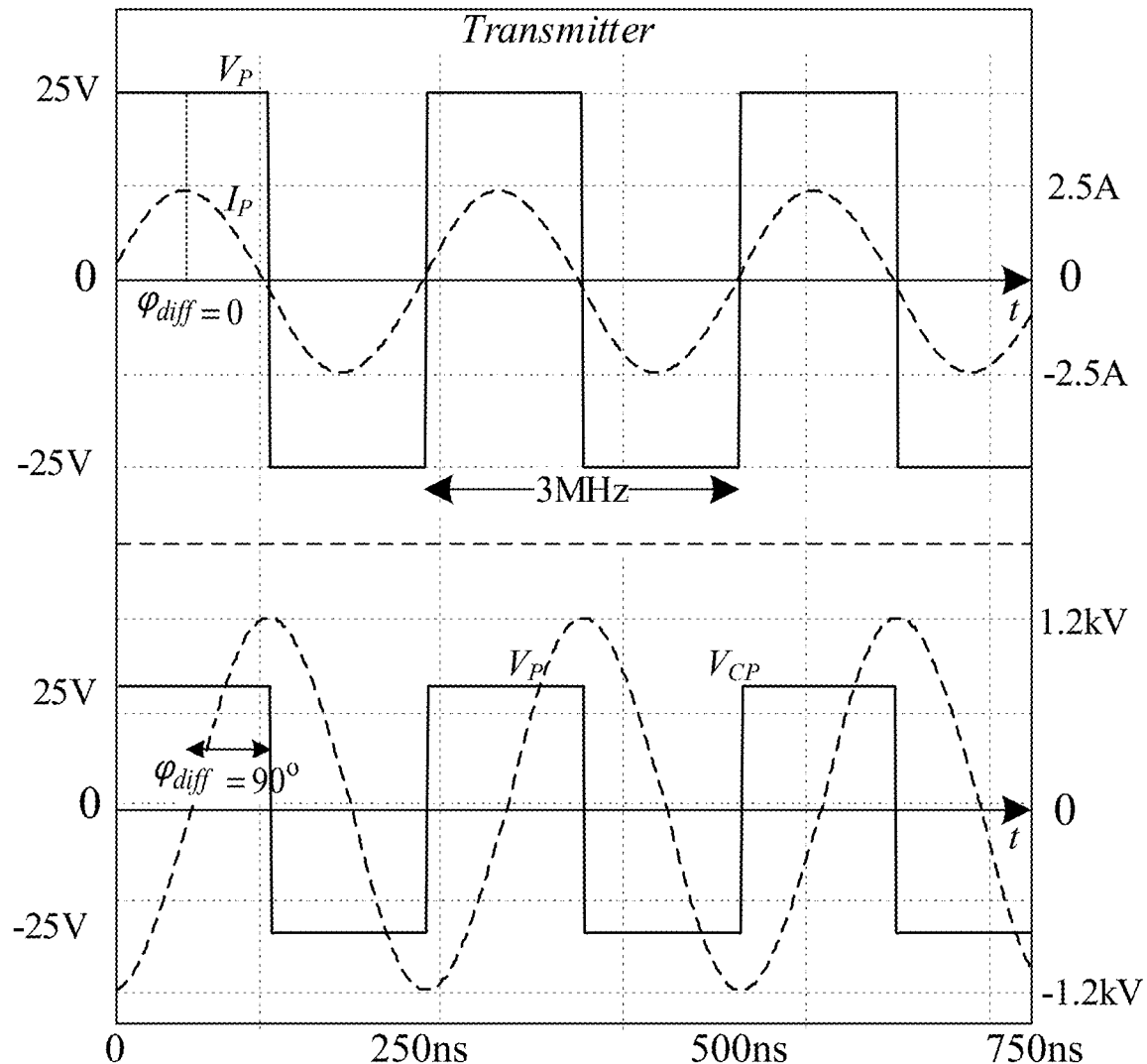
FIGS. 9a and 9b show the simulation results of the currents and voltages of the transmitter and receiver, respectively.
Figure 9B:
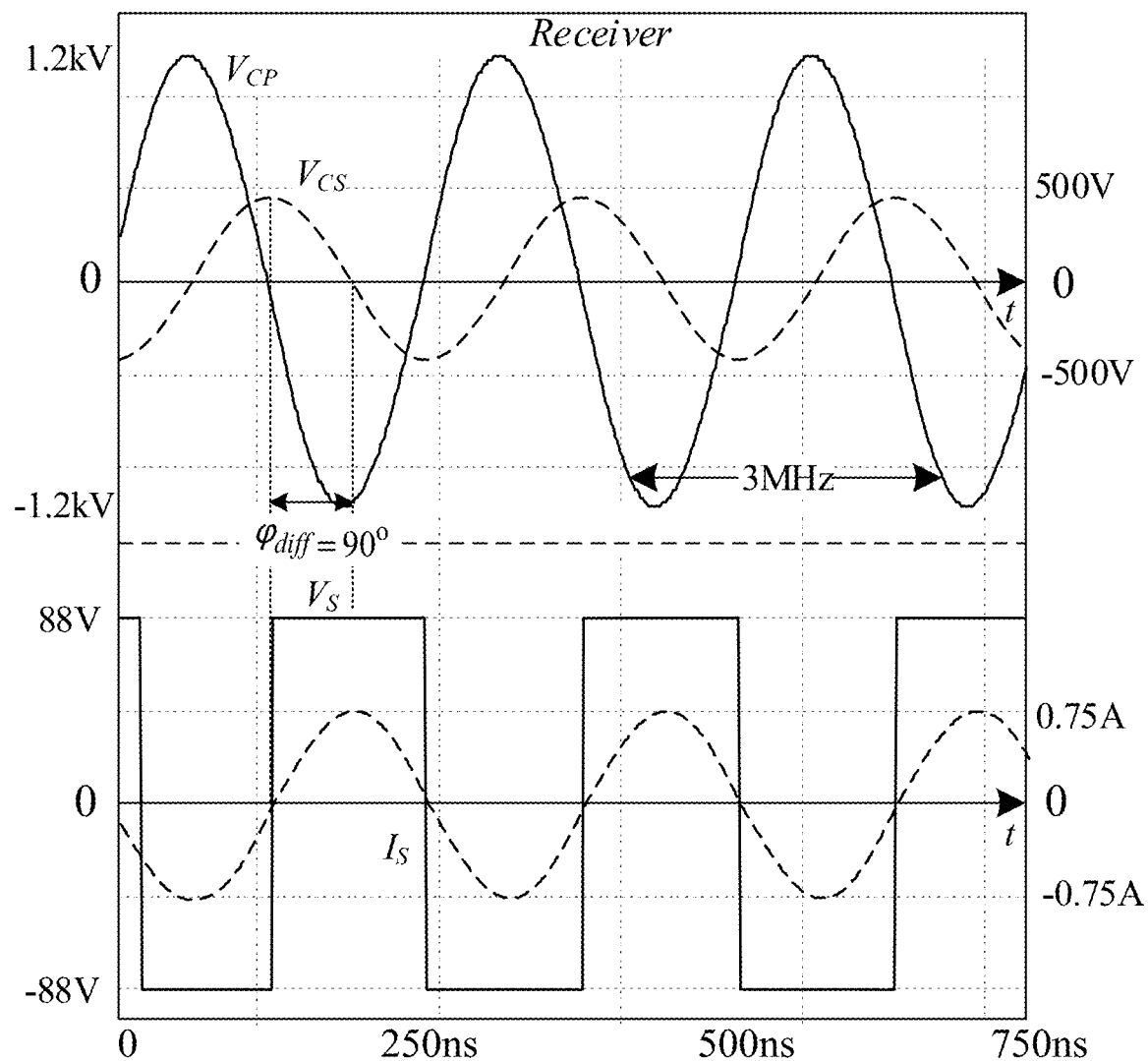

FIGS. 9a and 9b show the simulation results of the currents and voltages of the transmitter and receiver, respectively. It can be seen from FIG. 9a that the voltage $V_P$ toggles between −25 to 25 V. The sinusoidal voltage on the medium input, $V_{CP}$, peaks at 1.2 kV, where the phase difference between $V_P$ and $V_{CP}$ is ~90° as expected.

FIG. 9b shows the receiver waveforms with respect to $V_{CP}$. It can be seen that the sinusoidal voltage on the medium output, $V_{CS}$, lags $V_{CP}$ by ~90°. In addition, the voltage $V_S$ toggles between −88 to 88 V, which implies that the rectified voltage, i.e., the input voltage of the multi-level buck is 88 V. Moreover, given the target load conditions, the duty-cycle of the post-regulator is d=0.225, i.e., $V_{Load}$=20 V, which is in excellent agreement with the theoretical predictions in (6), (8) and (14). Assuming 100% efficiency for the simulation test-bench, and by using expressions (1) and (3), the load current is found to be $I_{Load}$=2 A, which is also in good agreement with the target load specifications.

Figure 10A:
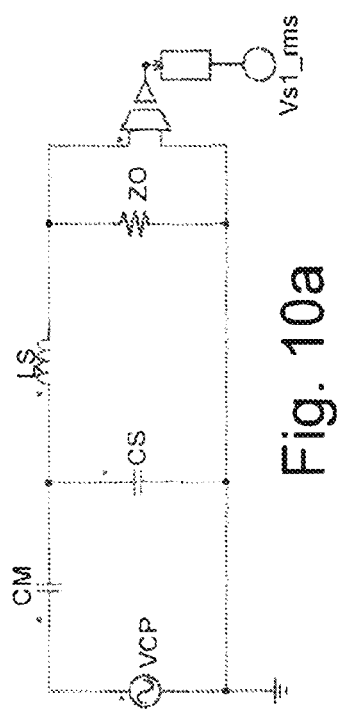
FIG. 10a shows simulation test-bench in PSIM platform for the behavioral model of the PRU side.

FIG. 10a shows a simulation test-bench, where, $V_{CP}$ is assumed constant (1.2 kV peak), $C_M$, $L_S$ and $C_S$ have been set according to Table I, and based on the expression in (7), the equivalent reflected impedance is $Z_o$=160.3Ω.

Figure 10B:
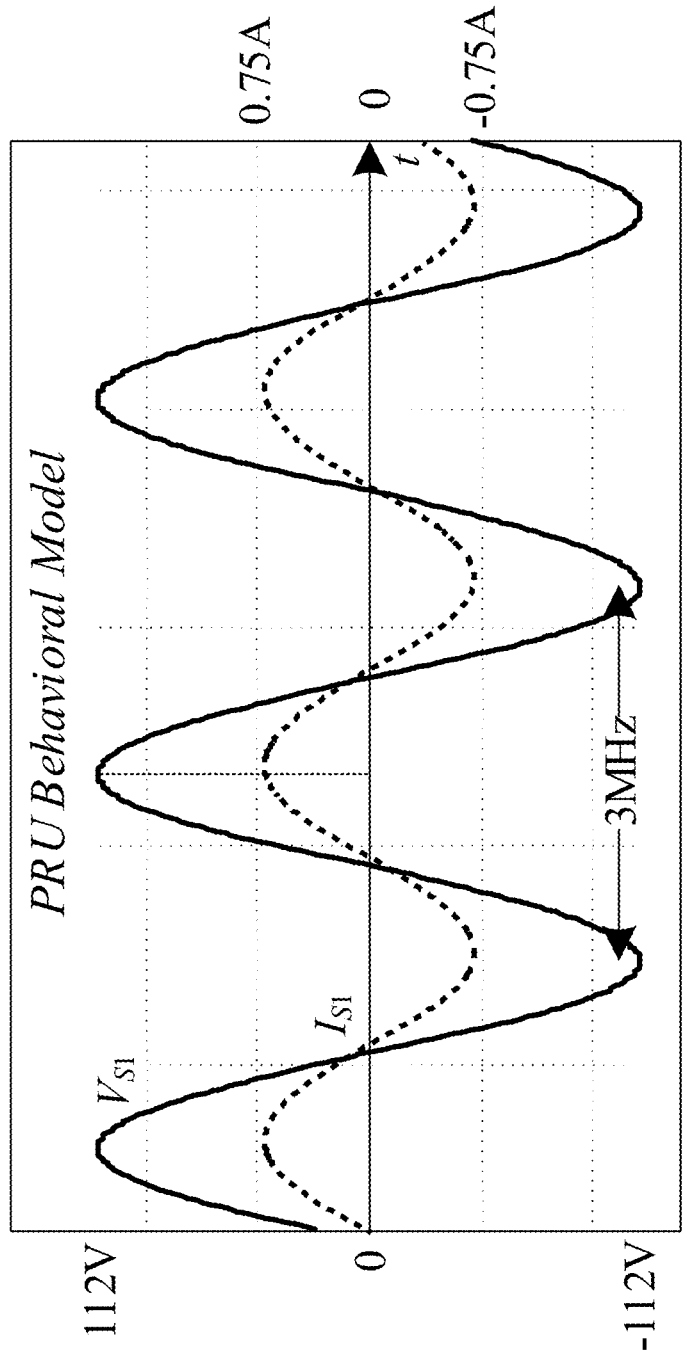
FIG. 10b shows simulation waveforms of the voltage and current.

FIG. 10b shows simulation results for the PRU first harmonics of the voltage and current. It can be seen that the current, $I_{S1}$, toggles between −0.75 to 0.75 A, which is in excellent agreement with the theoretical predictions and the end-to-end simulation results FIG. 10b). The first harmonic voltage $V_{S1}$ peaks at 112 V as expected from the results in FIG. 10b. Considering the rms values obtained by the behavioral model, it can be observed that the equivalent output power is 40 W as targeted.

Figure 11A:
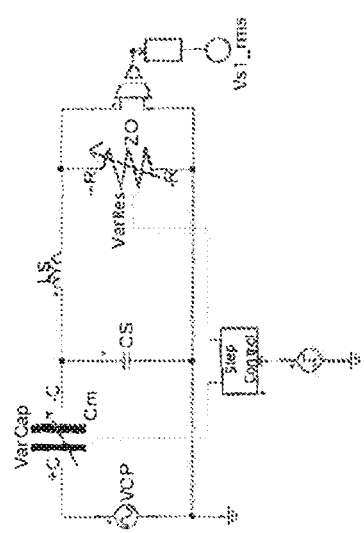
FIG. 11a-11c show modifications in the behavioral model test-bench.
Figure 11B:
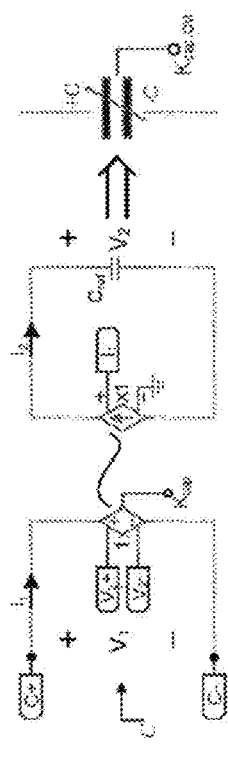
Figure 11C:
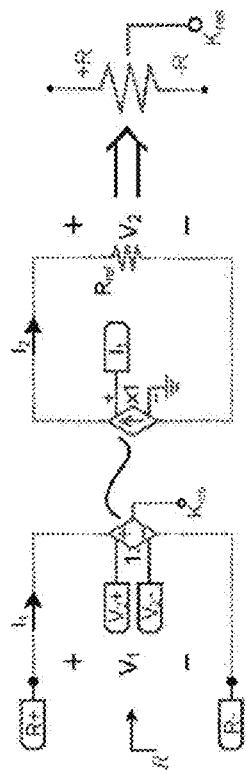

FIGS. 11a-11c show modifications in the behavioral model test-bench. The coupling capacitance $C_M$ has been replaced by a continues variable capacitor model FIG. 11b), and the reflected impedance, $Z_o$, has been replaced continues variable resistor model (FIG. 11c). The methodology to model continuous-time elements has been employed and adopted based on 0. By doing so, the behavioral model of the PRU is further analyzed for on-the-fly variations in $C_M$, while adjusting $Z_o$ accordingly.

The first medium variation has been carried out by changing the initial coupling capacitance from 14 pF to 20 pF (i.e. better coupling), this implies that $Z_o$ has been adjusted from 160.3Ω to 308Ω, or in terms of the duty-cycle of the post-regulator, from d=0.225 to d=0.16.

Figure 12A:
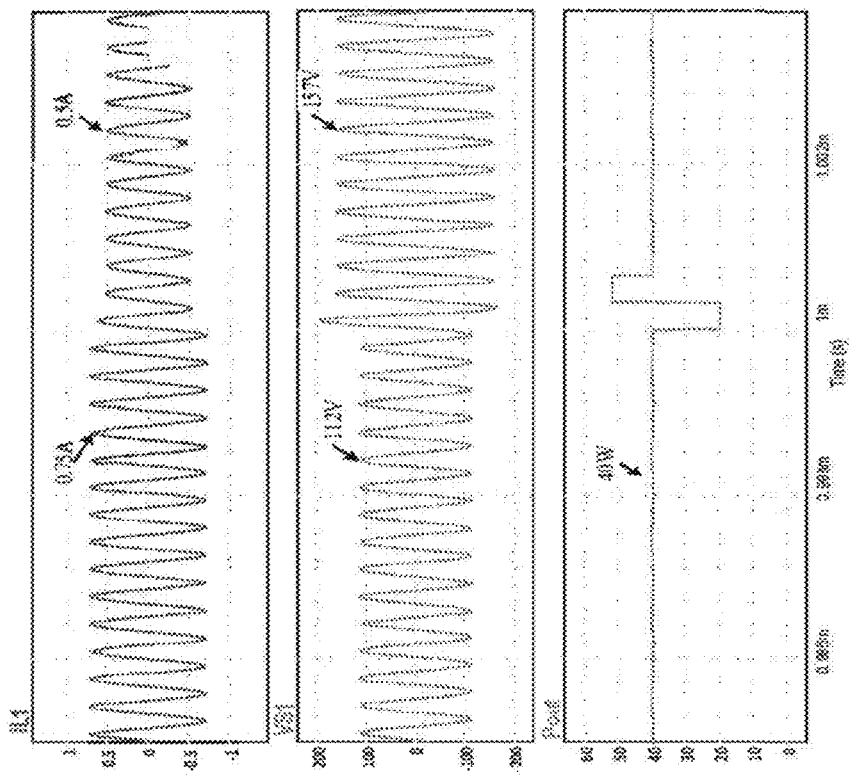
FIG. 12a-12b show the results for compensated and uncompensated systems.
Figure 12B:
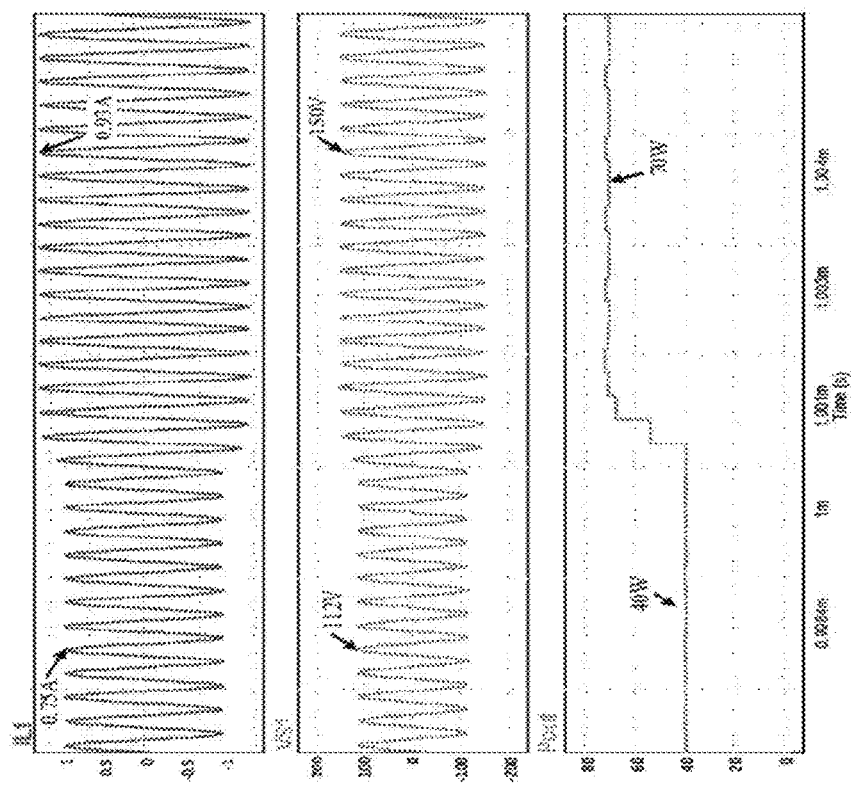

FIG. 12a-12b show the results for compensated and uncompensated systems. It can be seen that after the variation, for the compensated system FIG. 12a), the current drops from 0.75 A to 0.5 A, and the voltage increases to 157 V, while the overall output power maintained at 40 W. On the other hand, for the uncompensated system (FIG. 12b), it can be seen that both the current and voltage increase to 0.93A and 150 V, respectively. More importantly, the output power increases to 70 W, meaning that the overall system specifications are not obtained.

$C_M$ has been varied from 14 pF to 8 pF (i.e. worse coupling), this translates to adjusting $Z_o$ to 49Ω and d=0.4. 0a shows that after the transition due to medium variation, the tuned system sustains 40 W operation, where the current and voltage settles on 1.2 A and 61 V, respectively. Ob shows that for the given medium variation, the output power of the non-tuned system significantly drops to 15 W.

To further highlight the advantages of the HML buck converter as a post-regulation stage, given the above operating conditions, a more thorough comparison between buck and multi-level buck over wide range of the coupling capacitance has been carried out, as shown in FIG. 14. Loss estimation has been done for both topologies for various duty-cycles. It can be seen that for the given RWPT system, at extremely weak coupling ($C_M$<6 pF), in terms of efficiency, a conventional buck converter has reasonable efficiency over 91%. However, as the operating points move toward the strongly-coupled region ($C_M$>14 pF), where high-conversion ratios are required, the efficiency of the buck converter drops below 80%, whereas the HML buck converter remains above 80% efficiency up to $C_M$≈40 pF.

It should be noted that the blocking voltage of the chosen switches for both converters is $V_{ds}$=100 V. Therefore, in practice, for the given RWPT system regardless the efficiency criteria, the conversion range of the buck converter is limited to d=0.2, while the HML buck can be potentially pushed to 0.1 duty-cycle. It should be further emphasized that by compromising on the operation range such that 0.35≤d≤0.9, the switches of the buck converter can be optimized with lower blocking voltage $V_{ds}$=60 V, resulting in better efficiencies (similar to the HML buck) as illustrated by the dashed line in FIG. 14.

FIG. 14 also depicts the conversion range of a Series-Capacitor (SC) buck converter 0, to exemplify more design considerations of post-regulators in WPT. For the sake of simplicity, the parameters of the SC buck are same as for the previous converters, and by using the expression in (5), the duty ratio for the SC buck can be expressed as follows $$d_{SC-Buck} = \sqrt{\frac{32}{\pi^2} \frac{R_{Load}}{Z_O} \eta}. \tag{15}$$

Although SC buck converter is limited to maximum 50% duty-cycle, it can be seen that if the system is operated at $C_M$>15 pF while maintaining significantly wider operating range, SC buck converter would be a better candidate to perform such post-regulation task.

The first set of the experimental validation has been carried out by characterizing the operation range and the power conversion efficiency of the post-regulation stage. FIG. 15a shows efficiency measurements of the HML buck at nominal conditions (i.e., input voltage is 88 V and load voltage is 20 V) as a function of the load current. It can be seen that the efficiencies are above 96% over wide range of operating points. FIG. 15b shows losses breakdown of the post-regulator at various input voltages. It can be seen that as the input voltage increases, the switching losses become dominant, which implies that for the case of conventional buck converter, the switching losses will be higher, thereby further limiting the medium misalignment range.

FIG. 16a shows waveforms of the resonant WPT system has been examined for 40 W load output power, at 75 mm misalignment, which translates to ~14 pF, such that the transmitter's resonant current, $I_P$, is regulated to 2.5 A peak, and the voltage $V_P$ toggles between −35 and 35 V. The rectifier voltage at the receiver side, $V_S$, toggles between −90 and 90 V, while the current, Is, peaks at 1 A. Although there is slight imperfection in the rectifier behavior due to parasitic capacitances, the experimental results are in good agreement with the theoretical predictions in Section V.

FIG. 16b shows the main waveforms of the HML buck at steady-state operation. It can be observed that load voltage is 20 V, the effective switching frequency is ~500 kHz, and the effective duty-cycle is 22.4% (half of the duty ratio of the switching node).

Figure 17A:
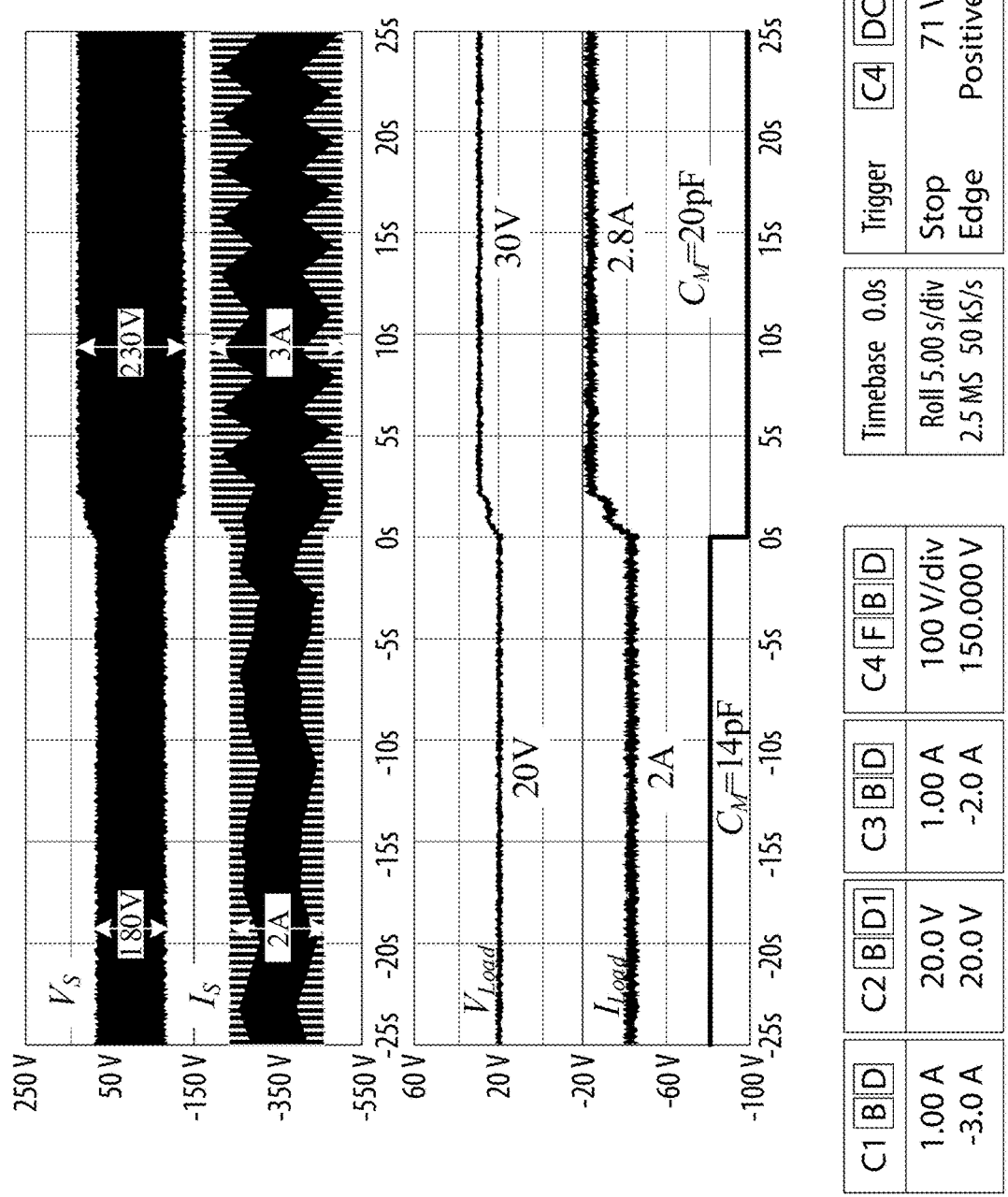
Figure 17B:
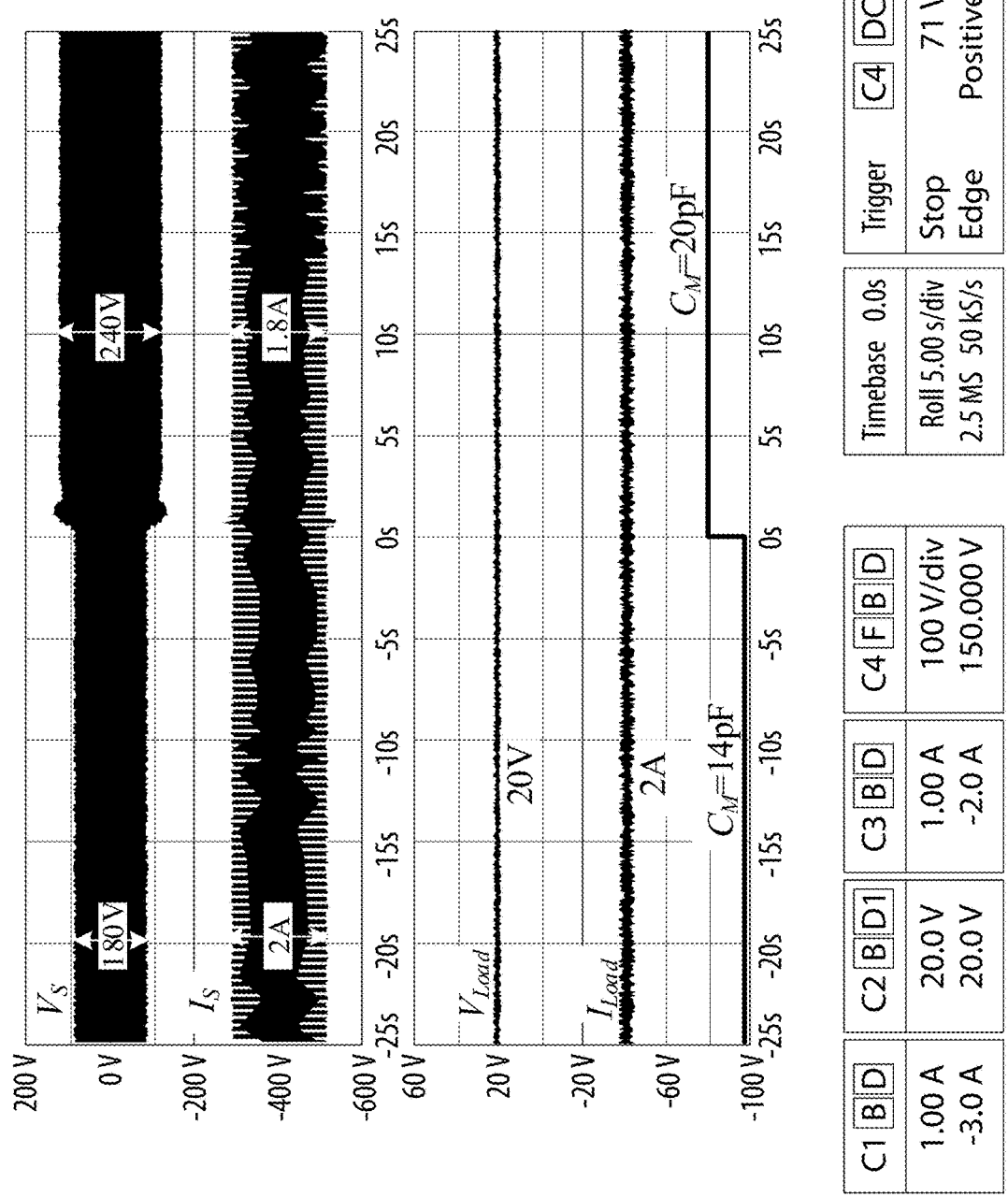
Figure 17C:
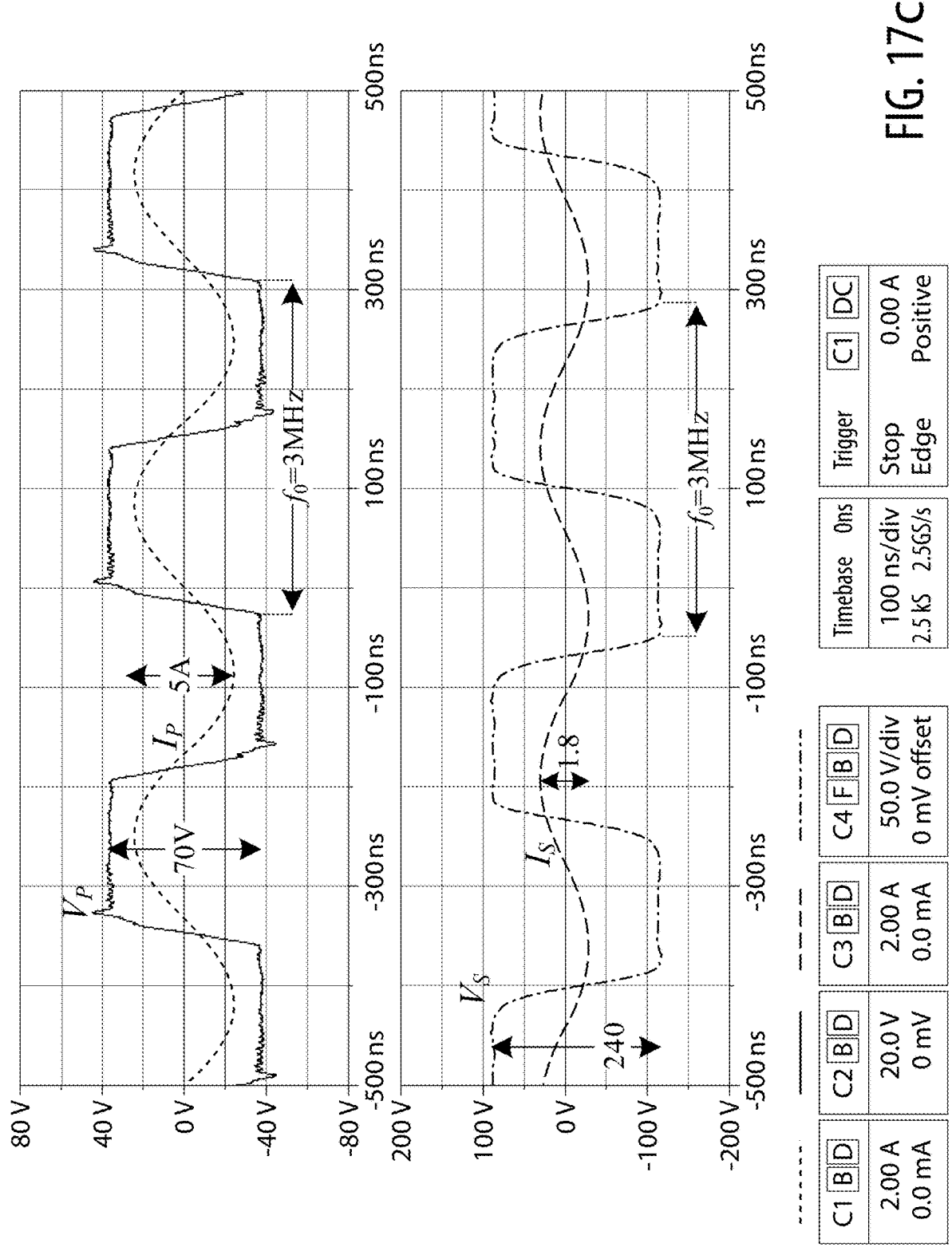
Figure 17D:
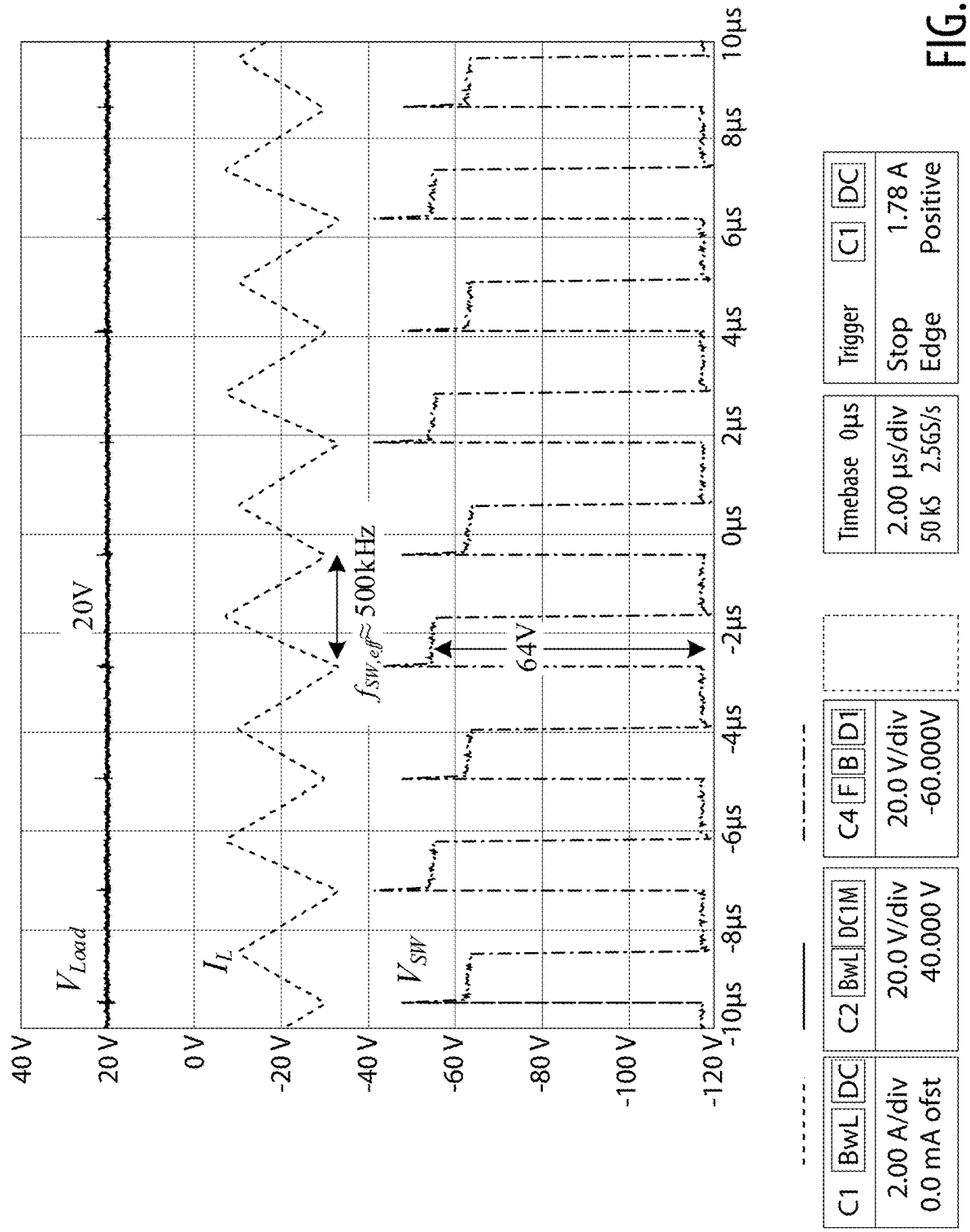

FIG. 17a-17d show experimental measurements for step-up in the medium, i.e., from 75 mm misalignment to fully aligned couple, which translates to coupling variation of 14 pF to 20 pF (a step-up converter is a DC-to-DC power converter which steps up voltage from its input to its output). FIG. 17a depicts the PRU's main waveforms without post-regulator. It can be seen that after variation of the coupler both the $V_S$ and Is increase to peak values of 115 V and 1.5 A, respectively. This results in load output power of ~85 W, approximately twice than the target load power. On the other hand, FIG. 17b shows the PRU's main waveforms with post-regulations stage. Although $V_S$ has not change much, it can be seen the Is drops by 20%, and the load power is well regulated to 40 W. FIG. 17c shows a zoom-in view on the transmitter and receiver main waveforms at steady-state with the post-regulator, and FIG. 17d shows the HML post-regulator main waveforms, where the effective duty-cycle is 16.66%.

Figure 18A:
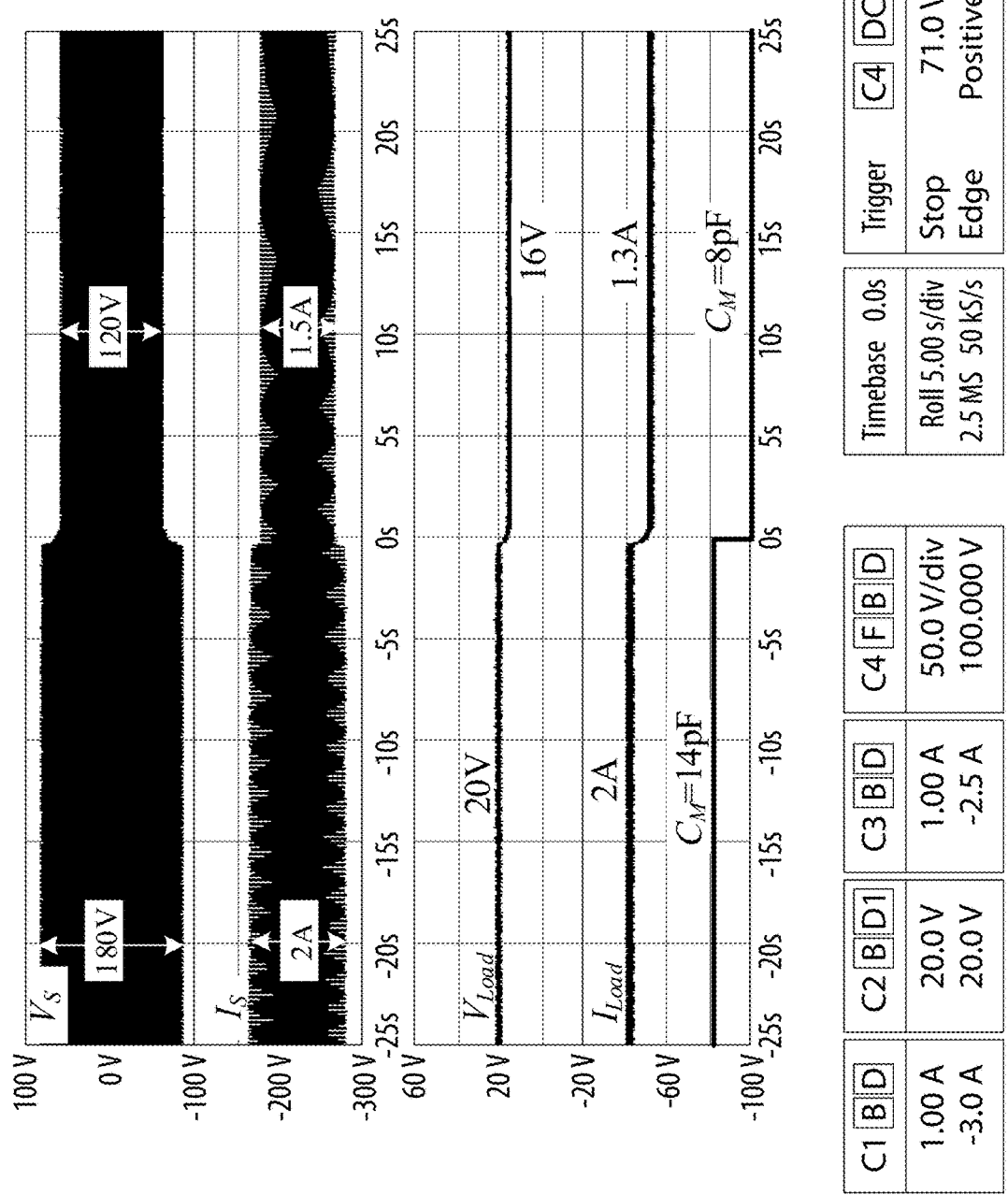
Figure 18B:
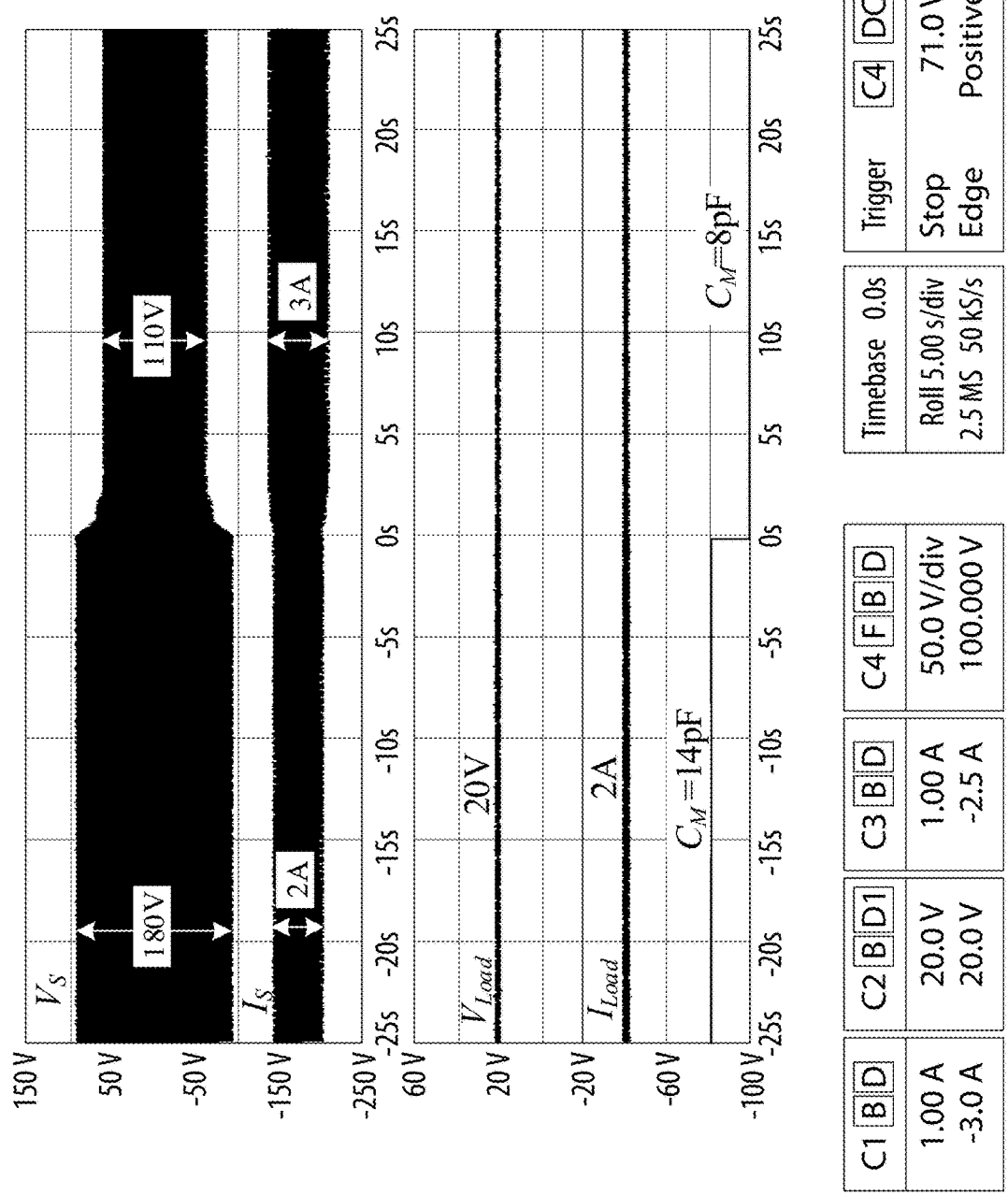
Figure 18C:
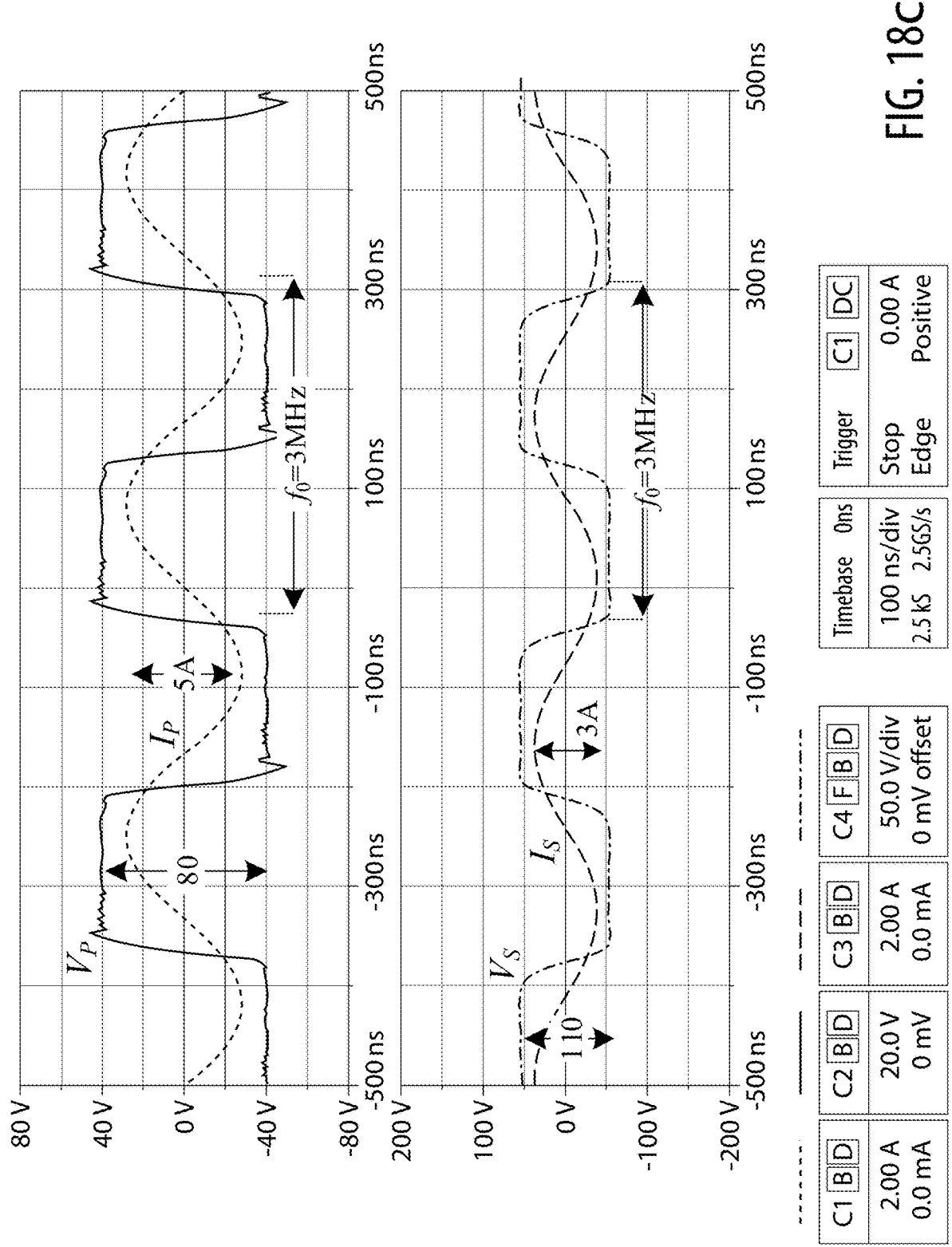
Figure 18D:
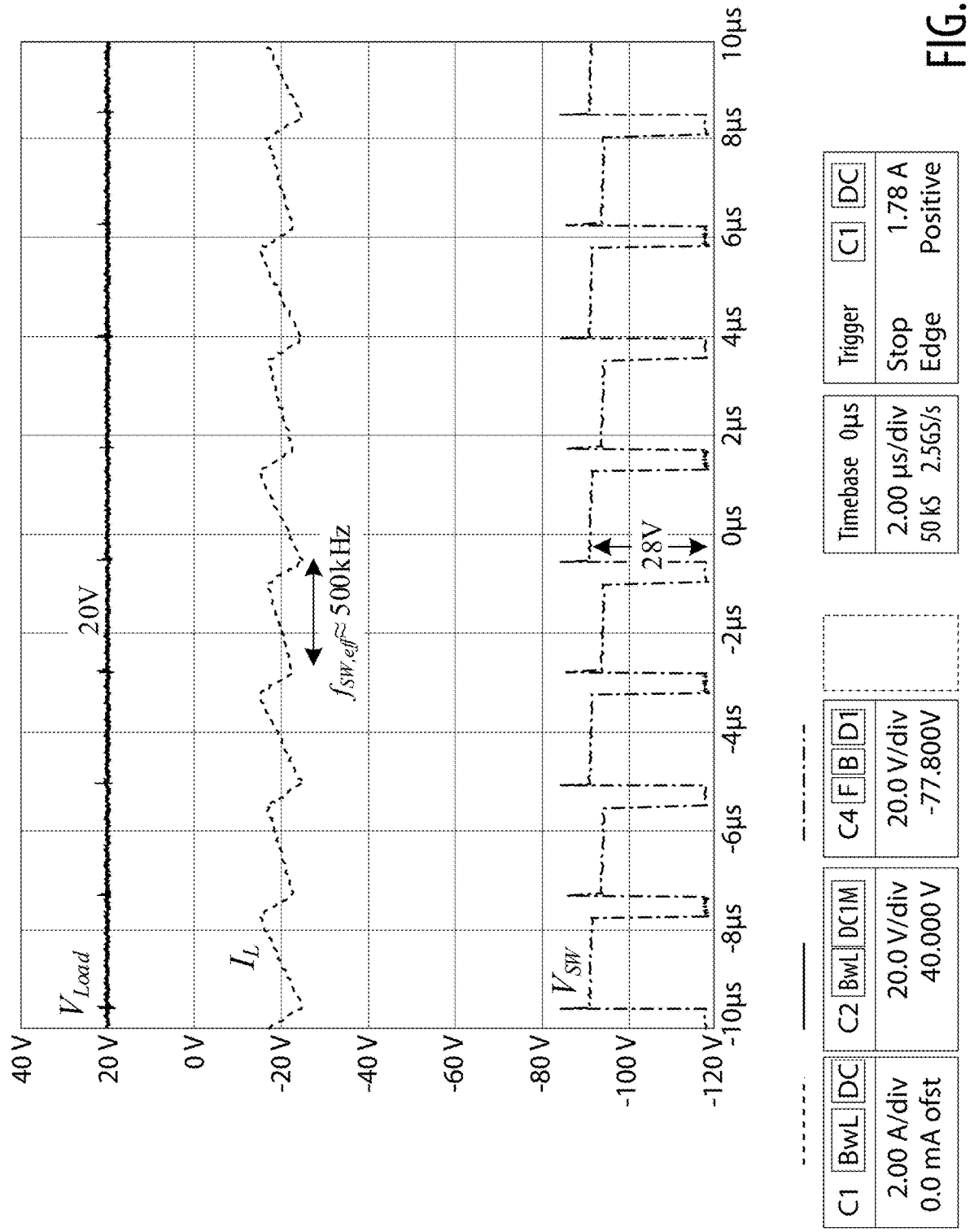

FIGS. 18a-18d show Experimental measurements of the capacitive RWPT system for step-down medium variation, 14 pF to 8 pF. The system has been also examined for step-down variation from 75 mm to 150 mm (14 pF to 8 pF). FIG. 18a shows that without post-regulation the load power drops by a factor of two to the range 20 W, while for the regulated system (FIG. 18b) the target load power is preserved. FIG. 18c depicts a zoom-in view on the transmitter and receiver main waveforms at steady-state with the post-regulator. It can be seen that the transmitter voltage, $V_P$, slightly increases to 40 V peak, due to low coupling at such misalignment (which adds more losses to the end-to-end system), while the receiver's voltage, $V_S$, drops to 55 V, i.e., 37% duty-cycle, which is in good agreement with the theoretical predictions. FIG. 18d shows post-regulator main waveforms.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

REFERENCES

Z. Zhang, H. Pang, A. Georgiadis, and C. Cecati, "Wireless power transfer—An overview," *IEEE Trans. Ind. Electron.*, vol. 66, no. 2, pp. 1044-158 Feb. 2019.

S. Y. R. Hui, "Wireless power transfer: A brief review & update," in *Power Electronics Systems and Applications* (PESA), 2013 5th International Conference on, December 2013, pp. 1-4.

M. P. Kazmierkowski and A. J. Moradewicz, "Unplugged but connected: Review of contactless energy transfer systems," *IEEE Industrial Electronics Magazine*, vol. 6, no. 4, pp. 47-55, December 2012.

F. Musavi and W. Eberle, "Overview of wireless power transfer technologies for electric vehicle battery charging," *IET Power Electron.*, vol. 7, no. 1, pp. 60-66, January 2014.

F. Lu, H. Zhang, C. Mi, "A two-plate capacitive wireless power transfer system for electric vehicle charging Applications," *IEEE Trans. Power Electron*, vol. 33, no. 2, pp. 946-969, August 2017.

F. Lu, H. Zhang, H. Hofmann, and C. Mi, "A double-sided LC compensation circuit for loosely-coupled capacitive power transfer," *IEEE Trans. Power Electron.*, vol. 33, no. 2, pp. 1633-1643 Feb. 2017.

A. Kurs, A. Karalis, R. Moffat, J. D. Joannopoulos, P. Fisher, and M. Soljacic, "Wireless power transfer via strongly coupled magnetic resonances," *Science*, vol. 317, no. 5834, pp. 83-86, July 2007

J. Shin et al., "Design and implementation of shaped magnetic-resonance-based wireless power transfer system for roadway-powered moving electric vehicles," *IEEE Trans. Ind. Electron.*, vol. 61, no. 3, pp. 1179-1192 Mar. 2014.

X. Qu et al., "Wide design range of constant output current using double-sided LC compensation circuits for inductive-power-transfer applications," *IEEE Trans. Power Electron.*, vol. 34, no. 3, pp. 2364-2374 Mar. 2019.

Y. Zhang, and M. A. de Rooij, "How eGaN® FETs are enabling large area wireless power transfer," *IEEE Workshop on Wide Bandgap Power Devices and Applications (WiPDA)*, October 2017, pp 366-372.

Y. Liu, B. Li, M. Huang, Z. Chen, and X. Zhang, "An overview of regulation topologies in resonant wireless power transfer systems for consumer electronics or bio-implants", in *Energies*, vol. 11, no. 7, 1737, 2018.

W. Zhang and C. Mi, "Compensation topologies for high power wireless power transfer systems," *IEEE Transactions on Vehicular Technology*, vol. 65, no. 6, pp. 4768-4778, july 2015.

Y. Lim, H. Tang, S. Lim, J. Park, "An adaptive impedance-matching network based on a novel capacitor matrix for wireless power transfer," *IEEE Transactions on Power Electronics*, vol. 29, no. 8, pp. 4403-4413 Aug. 2014.

T. C. Beh, M. Kato, T. Imura, S. Oh and Y. Hori, "Automated impedance matching system for robust wireless power transfer via magnetic resonance coupling," *IEEE Transactions on Industrial Electronics*, vol. 60, no. 9, pp. 3689-3698 Sep. 2013.

C. Kim, S. Ha, J. Park, A. Akinin, P. P. Mercier, and G. Cauwenberghs, "A 144-MHz fully integrated resonant regulating rectifier with hybrid pulse modulation for mm-sized implants," *IEEE J. Solid-State Circuits*, vol. 52, no. 11, pp. 3043-355 Nov. 2017.

H.-M. Lee, H. Park, and M. Ghovanloo, "A power-efficient wireless system with adaptive supply control for deep brain stimulation," IEEE J. Solid-State Circuits, vol. 48, no. 9, pp. 2203-2216 Sep. 2013.

H. G. Park et al., "A design of a wireless power receiving unit with a high-efficiency 6.78-MHz active rectifier using shared DLLs for magnetic-resonant A4 WP applications," *IEEE Trans. Power Electron.*, vol. 31, no. 6, pp. 4484-4498 Jun. 2016.

E. Ozalevli et al., "A cost-effective adaptive rectifier for low power loosely coupled wireless power transfer systems," *IEEE Trans. Circuits Syst. I: Regular Papers*, vol. 65, no. 7, pp. 2318-2329 Jul. 2018.

R. Tseng, B. V. Novak, S. Shevde, and K. A. Grajski, "Introduction to the alliance for wireless power loosely-coupled wireless power transfer system specification version 1.0," in *Proc. IEEE Wireless Power Transfer Conf.*, Perugia, Italy, May 15-16, 2013, pp. 79-83.

K.-G. Moh, F. Neri, S. Moon, P. Yeon, J. Yu, Y. Cheon, Y.-S. Roh, M. Ko, and B.-H. Park, "A fully integrated 6 W wireless power receiver operating at 6.78 MHz with magnetic resonance coupling," in *Proc. ISSCC,* 2015, pp. 230-232.

Y. J. Park et al., "A triple-mode wireless power-receiving unit with 85.5% system efficiency for A4WP, WPC, and PMA applications," *IEEE Trans. Power Electron.*, vol. 33, no. 4, pp. 3141-3156 Apr. 2018.

H. Li, Y. Tang, K. Wang, and X. Yang, "Analysis and control of post regulation of wireless power transfer systems," in *Proc. IEEE 2nd Annu. Southern Power Electron. Conf.*, 2016, pp. 1-5.

H. Li, J. Li, K. Wang, W. Chen, and Y. Xu, "A maximum efficiency point tracking control scheme for wireless power transfer systems using magnetic resonant coupling," *IEEE Trans. Power Electron.*, vol. 30, no. 7, pp. 3998-48 Jul. 2015.

Y. Lei, W. C. Liu, and R. C. N. Pilawa-Podgurski, "An analytical method to evaluate and design hybrid switched-capacitor and multilevel converters," in *IEEE Trans. Power Electron.*, vol. 33, no. 3, pp. 2227-2240 Mar. 2017.

Z. Liao, Y. Lei, and R. C. N. Pilawa-Podgurski, "Analysis and design of a high-power density flying-capacitor multilevel boost converter for high step-up conversion," in *IEEE Transactions on Power Electronics,* 2018.

S. M. Ahsanuzzaman, Y. Ma, A. A. Pathan, and A. Prodic, "A low-volume hybrid step-down dc-dc converter based on the dual use of flying capacitor," in Proc. *IEEE Appl. Power Electron. Conf. Expo.*, March 2016, pp. 2497-2503.

O. Kirshenboim and M. M. Peretz, "High-efficiency non-isolated converter with very high step-down conversion ratio," *IEEE Trans. Power Electron.*, vol. 32, no. 5, pp. 3683-3690 May 2017.

Y. Jang and M. M. Jovanovic, "Non-isolated power conversion system having multiple switching power converters," U. S. patent application Ser. No. 10/972,632, Oct. 26, 2004.

X. Qu et al., "Wide design range of constant output current using double-sided LC compensation circuits for inductive-power-transfer applications," *IEEE Trans. Power Electron.*, vol. 34, no. 3, pp. 2364-2374 Mar. 2019

M. P. Theodoridis, "Effective capacitive power transfer," *IEEE Trans. Power Electron.*, vol. 27, no. 12, pp. 4906-4913 Dec. 2012.

S. Sinha, A. Kumar, B. Regensburger, and K. K. Afridi, "A new design approach to mitigating the effect of parasitics in capacitive wireless power transfer systems for electric vehicle charging," *IEEE Trans. Transp. Electrific.*, vol. 5, no. 4, pp. 1040-159 Dec. 2019.

C. Liu, A. P. Hu, and M. Budhia, "A generalized coupling model for capacitive power transfer systems," *Proc. 36th Annual Conf. on IEEE Ind. Electron. Society*, Glendale, AZ, pp. 274-279, November 2010.

R. L. Steigerwald, "A comparison of half-bridge resonant converter topologies," *IEEE Transactions on Power Electronics*, vol. 3, no. 2, pp. 174-182, April 1988.

Robert W. Erickson and Dragan Maksimovíc, "Fundamentals of power electronics", Second Edition, New York: Springer Science+Business Media, 2001.

B. J. Baliga, "Fundamentals of power semiconductor devices", Springer Science, 2008.

Y. Lei, W. C. Liu, and R. C. N. Pilawa, "An analytical method to evaluate flying capacitor multilevel converter and hybrid switched-capacitor converters for large voltage conversion ratios," in *Proc. IEEE Workshop on Control and Modeling for Power Electronics (COMPEL)*, August 2015.

E. Abramov and M. M. Peretz, "Adaptive self-tuned mixed-signal controller IC for resonant wireless power transfer," in *IEEE Applied Power Electronics Conference and Exposition (APEC)*, March 2020, pp. 805-812.

E. Abramov, J. M. Alonso, and M. M. Peretz, "Analysis and behavioral modelling of matching networks for resonant-operating capacitive wireless power transfer," in *IET Power Electronics*, vol. 12, no. 10, pp. 2615-2625 Aug. 2019.

https://epc-co.com/epc/Portals/0/epc/documents/datasheets/EPC2034_datasheet.pdf.

DE0-Nano Development and Education Board user manual, terasIC Inc.-Intel, 2016.

https://www.intel.com/content/dam/www/programmable/us/en/pdfs/literature/hb/max-10/m10_datasheet.pdf E. Abramov, T. Vekslender, O. Kirshenboim, and M. M. Peretz, "Fully-integrated digital average current-mode control voltage regulator module IC," *IEEE Journal on Emerging and Selected Topics in Power Electronics*, vol. 6, no. 2, pp. 549-562, June 2018.

T. Vekslender, E. Abramov, O. Kirshenboim and M. M. Peretz, "Hardware efficient digital auto-tuning average current-mode controller," *IEEE 18th Workshop on Control and Modeling for Power Electronics (COMPEL)*, Stanford, CA, 2017, pp. 1-8.

The invention claimed is:

1. A power-regulation method for a Power Receiving Unit (PRU) of an RWPT system, comprising:
a) connecting a load to said PRU via an ML post-regulation stage;
b) determining target/predicted values for voltage and current of a Power Transmitting Unit (PTU) of said RWPT system;
c) determining wireless medium characteristics and a resonant frequency of said RWPT system;
d) generating an overall system model by using First Harmonic Approximation (FHA);
e) determining a desired output power;
f) calculating a voltage $V_{S1}$ of a first harmonic;
g) using $V_{S1}$ to calculate an equivalent reflected impedance $Z_0$ of said load; and
h) calculating a duty-cycle d using predicted values of an efficiency η of a conversion ratio M(D) and said calculated equivalent reflected impedance $Z_0$.

2. A method according to claim 1, wherein the ML post-regulation stage is integrated into the PRU or performs step-up, step-down conversion ratios, or both, or is implemented in a Hybrid Multi-Level (HML) topology with a high conversion ratio.

3. A method according to claim 1, further comprising one or more of the following:
using HML post-regulation for performing wide impedance matching for the RWPT system;
working at optimal operating conditions.

4. A method according to claim 2, wherein the HML post-regulator is cascaded with an AC-DC rectifier stage.

5. A method according to claim 1, wherein the ML post-regulation stage is designed according to specific target wireless operating conditions.

6. A method according to claim 1, wherein the PTU comprises:
a) a DC-DC pre-regulation stage;
b) a DC-AC power inverter;
c) a transmitter resonator, resonating at the same frequency as a resonator of the PRU;
d) a power transmitting element; and
e) a controller for compensating misalignments between said PTU and said PRU.

7. A method according to claim 1, wherein the PRU comprises:
a) a pick-up element;
b) a receiver resonator, resonating at the same frequency as a resonator of the PTU;
c) an AC-DC rectifier;
d) a DC-DC hybrid post-regulation stage; and
e) a controller for compensating misalignments between said PTU and said PRU.

8. A method according to claim 1, wherein the power regulation is made for several PRUs simultaneously, wherein each PRU comprises a corresponding HML post-regulator.

9. A method according to claim 2, wherein the PRU comprises a high-conversion HML Buck post-regulation stage.

10. A method according to claim 9, wherein the Buck post-regulation stage comprises:
a) four power switches;
b) a flying capacitor;
c) an output inductor;
d) an output capacitor;
e) a sensing circuitry for a controller.

11. A power-regulated Power Receiving Unit (PRU) of an RWPT system, comprising:
a) an ML post-regulation stage via which a load is connected to said PRU;

b) a controller circuit, being adapted to:
c) determine target/predicted values for voltage and current of a Power Transmit Unit (PTU) of the RWPT system;
d) determine wireless medium characteristics and a resonant frequency of the RWPT system;
e) generate an overall system model by using First Harmonic Approximation (FHA);
f) determine a desired output power;
g) calculate a voltage $V_{S1}$ of a first harmonic;
h) use $V_{S1}$ to calculate an equivalent reflected impedance $Z_O$ of the load; and
i) calculate a duty-cycle d using predicted values of an efficiency η of a conversion ratio M(D) and the calculated equivalent reflected impedance $Z_O$.

12. A power-regulated PRU according to claim 11, in which the controller is adapted to examine duty-cycle ranges and post-regulator performance for corner operating points of the RWPT system.

13. A power-regulated PRU according to claim 11, in which the ML post-regulation stage is integrated into the PRU or performs step-up, step-down conversion ratios, or both, or is implemented in a Hybrid Multi-Level (HML) topology with a high conversion ratio.

14. A power-regulated PRU according to claim 11, in which HML post-regulation is used for performing wide impedance matching for the RWPT system or cascaded with an AC-DC rectifier stage.

15. A power-regulated PRU according to claim 11, in which the ML post-regulation stage is designed according to specific target wireless operating conditions.

16. A power-regulated PRU according to claim 11, in which the PTU comprises:

a) a DC-DC pre-regulation stage;
b) a DC-AC power inverter;
c) a transmitter resonator, resonating at the same frequency as a resonator of the PRU;
d) a power transmitting element; and
e) a controller for compensating misalignments between the PTU and the PRU.

17. A power-regulated PRU according to claim 11, in which the PRU comprises:

a) a pick-up element;
b) a receiver resonator, resonating at the same frequency as a resonator of the PTU;
c) an AC-DC rectifier;
d) a DC-DC hybrid post-regulation stage; and
e) a controller for compensating misalignments between the PTU and the PRU.

18. A power-regulated PRU according to claim 11, in which the power regulation is made for several PRUs simultaneously, wherein each PRU comprises a corresponding HML post-regulator.

19. A power-regulated PRU according to claim 11, in which the PRU comprises a high-conversion HML Buck post-regulation stage.

20. A power-regulated PRU according to claim 19, in which the Buck post-regulation stage comprises:

a) four power switches;
b) a flying capacitor;
c) an output inductor;
d) an output capacitor;
e) a sensing circuitry for a controller.

* * * * *